US010587801B2

(12) United States Patent
Satomi et al.

(10) Patent No.: US 10,587,801 B2
(45) Date of Patent: Mar. 10, 2020

(54) BIRD'S-EYE VIEW VIDEO GENERATION DEVICE, BIRD'S-EYE VIEW VIDEO GENERATION SYSTEM, BIRD'S-EYE VIEW VIDEO GENERATION METHOD, AND NON-TRANSITORY STORAGE MEDIUM

(71) Applicant: JVC KENWOOD Corporation, Yokohama-shi, Kanagawa (JP)

(72) Inventors: Tsuneo Satomi, Yokohama (JP); Manabu Asayama, Yokohama (JP); Toshio Mori, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/208,650

(22) Filed: Dec. 4, 2018

(65) Prior Publication Data

US 2019/0116315 A1   Apr. 18, 2019

Related U.S. Application Data

(63) Continuation of application No. PCT/JP2017/024558, filed on Jul. 4, 2017.

(30) Foreign Application Priority Data

Sep. 20, 2016   (JP) .................................. 2016-183103
Sep. 21, 2016   (JP) .................................. 2016-184461
Apr. 3, 2017    (JP) .................................. 2017-073368

(51) Int. Cl.
*H04N 5/232*   (2006.01)
*B60R 1/00*    (2006.01)
(Continued)

(52) U.S. Cl.
CPC ........... *H04N 5/23238* (2013.01); *B60R 1/00* (2013.01); *G06T 3/4038* (2013.01); *G06T 11/60* (2013.01);
(Continued)

(58) Field of Classification Search
None
See application file for complete search history.

(56) References Cited

U.S. PATENT DOCUMENTS

| 2006/0274147 | A1* | 12/2006 | Chinomi | ................... B60R 1/00 |
| | | | | 348/118 |
| 2012/0218412 | A1* | 8/2012 | Dellantoni | ......... G01C 21/3602 |
| | | | | 348/148 |
| 2018/0022357 | A1* | 1/2018 | Mori | ..................... G07C 5/0866 |
| | | | | 280/735 |

FOREIGN PATENT DOCUMENTS

| CN | 105242276 | 1/2016 |
| EP | 1179958 | 2/2002 |

(Continued)

OTHER PUBLICATIONS

International Search Report and Written Opinion for International Patent Application No. PCT/JP2017/024558 dated Sep. 26, 2017, 12 pages.

(Continued)

*Primary Examiner* — Eileen M Adams
(74) *Attorney, Agent, or Firm* — Amin, Turocy & Watson, LLP

(57) ABSTRACT

An bird's-eye view video generation device includes a video capturing unit configured to capture a surrounding video of a vehicle, an obstacle information obtaining unit configured to obtain obstacle information including a distance to the obstacle, a video generating unit configured to generate an bird's-eye view video by performing viewpoint conversion with respect to the surrounding video so that, when the distance to the detected obstacle is equal to or longer than a threshold value, generate the bird's-eye view video in which a vehicle icon is displayed at the center thereof enclosed by the bird's-eye view video and the obstacle information is superimposed thereon, and when the distance is shorter than (Continued)

the threshold value, generate the bird's-eye view video in which the obstacle information is superimposed on the center thereof enclosed by the bird's-eye view video, and a display controller configured to display the bird's-eye view video in a display.

9 Claims, 23 Drawing Sheets

(51) Int. Cl.
  *G06T 3/40*     (2006.01)
  *G06T 11/60*    (2006.01)
  *H04N 7/18*     (2006.01)
  *H04N 5/247*    (2006.01)
  *H04N 5/272*    (2006.01)

(52) U.S. Cl.
  CPC ......... *H04N 5/23218* (2018.08); *H04N 5/247* (2013.01); *H04N 5/272* (2013.01); *H04N 7/181* (2013.01); *H04N 7/188* (2013.01); *B60R 2300/105* (2013.01); *B60R 2300/30* (2013.01); *B60R 2300/301* (2013.01); *B60R 2300/305* (2013.01); *B60R 2300/607* (2013.01)

(56) References Cited

FOREIGN PATENT DOCUMENTS

| | | |
|---|---|---|
| EP | 1731366 | 12/2006 |
| JP | 2006-341641 | 12/2006 |
| JP | 2011-251681 | 12/2011 |
| JP | 2015-076645 | 4/2015 |

OTHER PUBLICATIONS

Extended European Search Report for European Patent Application No. 17852654.7 dated Jun. 18, 2019.

* cited by examiner

BIRD'S-EYE VIEW VIDEO GENERATION DEVICE, BIRD'S-EYE VIEW VIDEO GENERATION SYSTEM, BIRD'S-EYE VIEW VIDEO GENERATION METHOD, AND NON-TRANSITORY STORAGE MEDIUM

CROSS-REFERENCE TO RELATED APPLICATIONS

This application is a Continuation of PCT International Application No. PCT/JP2017/024558 filed in Japan on Jul. 4, 2017, which claims priority to and incorporates by references the entire contents of Japanese Patent Application No. 2016-183103 filed in Japan on Sep. 20, 2016, Japanese Patent Application No. 2016-184461 filed in Japan on Sep. 21, 2016 and Japanese Patent Application No. 2017-073368 filed in Japan on Apr. 3, 2017.

FIELD

The present application relates to an bird's-eye view video generation device, an bird's-eye view video generation system, an bird's-eye view video generation method, and a non-transitory storage medium.

BACKGROUND

A technology related to a vehicle-surrounding display device is known for displaying a bird's-eye view video of a vehicle along with an image of the vehicle (for example, see Japanese Patent Application Laid-open No. 2015-076645).

Meanwhile, in an in-vehicle device such as a navigation device that is used for displaying the bird's-eye view video of the vehicle, a display panel is often provided in a horizontally long shape. Hence, a bird's-eye view video in a vertically long shape is not displayed over an entire screen of the display panel. In this regard, a technology is known in which, when an obstacle approaching the concerned vehicle is detected, the bird's-eye view video of the vehicle and a video for the direction of the captured obstacle are displayed side by side (for example, see Japanese Patent Application Laid-open No. 2011-251681).

SUMMARY

There is a technology in which, in order to make it easier to confirm surrounding of a vehicle, obstacle information about the obstacles detected in the surrounding of the vehicle is displayed in a superimposed manner on the bird's-eye view video. However, as a result of superimposing the obstacle information on the bird's-eye view video, visibility of the obstacles displayed in the bird's-eye view video may be deteriorated.

Moreover, in the technology disclosed in Patent Literature 2, when an obstacle is detected, the driver must move his or her line of sight for confirming the bird's-eye view video and the video for the direction of the detected obstacle.

An bird's-eye view video generation device, an bird's-eye view video generation system, an bird's-eye view video generation method, and a non-transitory storage medium are disclosed.

According to one aspect, there is provided an bird's-eye view video generation device comprising: a video capturing unit configured to capture a surrounding video in which surrounding of a vehicle is imaged; an obstacle information obtaining unit configured to obtain obstacle information of an obstacle detected around the vehicle including a distance to the detected obstacle; a video generating unit configured to generate an bird's-eye view video by performing viewpoint conversion with respect to the surrounding video captured by the video capturing unit so that the vehicle is viewed from above; and a display controller configured to display the bird's-eye view video generated by the video generating unit in a display, wherein the video generating unit is further configured to; when the distance to the detected obstacle is determined to be equal to or longer than a threshold value based on the obstacle information obtained by the obstacle information obtaining unit, generate the bird's-eye view video in which a vehicle icon which indicates the vehicle is displayed at the center thereof enclosed by the bird's-eye view video and the obstacle information is superimposed thereon; and when the distance to the detected obstacle is determined to be shorter than the threshold value based on the obstacle information obtained by the obstacle information obtaining unit, generate the bird's-eye view video in which the obstacle information is superimposed on the center thereof enclosed by the bird's-eye view video.

According to one aspect, there is provided an bird's-eye view video generation method comprising: capturing a surrounding video in which surrounding of a vehicle is captured; obtaining obstacle information of an obstacle detected around the vehicle including a distance to the detected obstacle; generating an bird's-eye view video by performing viewpoint conversion with respect to the captured surrounding video so that the vehicle is viewed from above; and displaying the generated bird's-eye view video in a display, wherein in the generating the bird's-eye view video, when the distance to the detected obstacle is determined to be equal to or longer than a threshold value based on the obtained obstacle information, generating the bird's-eye view video in which a vehicle icon which indicates the vehicle is displayed at the center thereof enclosed by the bird's-eye view video and the obstacle information is superimposed thereon; and when the distance to the detected obstacle is determined to be shorter than the threshold value based on the obstacle information obtained by the obstacle information obtaining unit, generating the bird's-eye view video in which the obstacle information is superimposed on the center thereof enclosed by the bird's-eye view video.

According to one aspect, there is provided a non-transitory storage medium that stores a program that causes a computer, which functions as an bird's-eye view video generation device, to execute: capturing a surrounding video in which surrounding of a vehicle is captured; obtaining obstacle information of an obstacle detected around the vehicle including a distance to the detected obstacle; generating an bird's-eye view video by performing viewpoint conversion with respect to the captured surrounding video so that the vehicle is viewed from above; and displaying the generated bird's-eye view video in a display, wherein in the generating the bird's-eye view video, when the distance to the detected obstacle is determined to be equal to or longer than a threshold value based on the obtained obstacle information, generating the bird's-eye view video in which a vehicle icon which indicates the vehicle is displayed at the center thereof enclosed by the bird's-eye view video and the obstacle information is superimposed thereon; and when the distance to the detected obstacle is determined to be shorter than the threshold value based on the obstacle information obtained by the obstacle information obtaining unit, generating the bird's-eye view video in which the obstacle information is superimposed on the center thereof enclosed by the bird's-eye view video.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Exemplary embodiments of a bird's-eye view video generation device 40, a bird's-eye view video generation system 1, a bird's-eye view video generation method, and a program according to the present application are described below in detail with reference to the accompanying drawings. However, the present application is not limited by the embodiments described below.

[First Embodiment]

Figure 1:
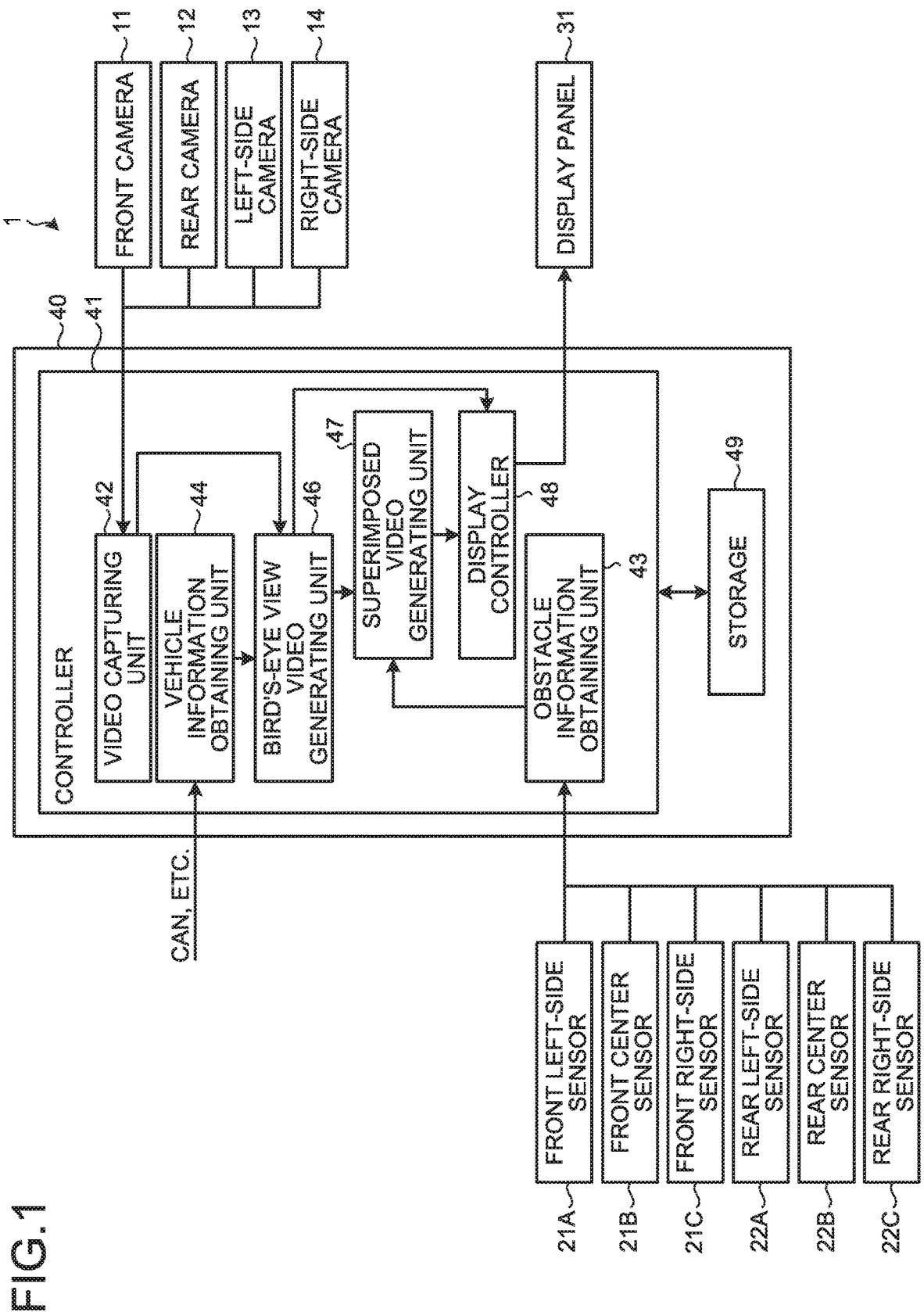
FIG. 1 is a block diagram illustrating an exemplary configuration of a bird's-eye view video generation system according to a first embodiment.

FIG. 1 is a block diagram illustrating an exemplary configuration of a bird's-eye view video generation system according to a first embodiment. The bird's-eye view video generation system 1 generates a bird's-eye view video 100 of a vehicle (see FIG. 2). The bird's-eye view video generation device 40 and the bird's-eye view video generation system 1 are installed in a vehicle. As an alternative to being installed in a vehicle, the bird's-eye view video generation device 40 and the bird's-eye view video generation system 1 can be portable devices usable in a vehicle.

The explanation about the bird's-eye view video generation system 1 is given with reference to FIG. 1. The bird's-eye view video generation system 1 includes a front camera (camera) 11, a rear camera (camera) 12, a left side camera (camera) 13, a right side camera (camera) 14, a front left-side sensor (obstacle detecting unit) 21A, a front center sensor (obstacle detecting unit) 21B, a front right-side sensor (obstacle detecting unit) 21C, a rear left-side sensor (obstacle detecting unit) 22A, a rear center sensor (obstacle detecting unit) 22B, a rear right-side sensor (obstacle detecting unit) 22C, a display panel 31, and the bird's-eye view video generation device 40.

The front camera 11 is installed in a front side of the vehicle for capturing a video of surrounding of the vehicle with focusing on the front side. The front camera 11 outputs the captured video to a video capturing unit 42 of the bird's-eye view video generation device 40.

The rear camera 12 is installed in a rear side of the vehicle for capturing a video of the surrounding of the vehicle with focusing on the rear side. The rear camera 12 outputs the captured video to the video capturing unit 42 of the bird's-eye view video generation device 40.

The left side camera 13 is installed in a left side of the vehicle for capturing a video of the surrounding of the vehicle with focusing on the left side. The left side camera 13 outputs the captured video to the video capturing unit 42 of the bird's-eye view video generation device 40.

The right side camera 14 is installed in a right side of the vehicle for capturing a video of the surrounding of the vehicle with focusing on the right side. The right side camera 14 outputs the captured video to the video capturing unit 42 of the bird's-eye view video generation device 40.

Thus, by using the front camera 11, the rear camera 12, the left side camera 13, and the right side camera 14 the surrounding in all directions of the vehicle is captured.

The front left-side sensor 21A is installed in the front left-side of the vehicle for detecting obstacles present in the front left-side of the vehicle. For example, the front left-side sensor 21A can be an infrared sensor, or an ultrasonic sensor, or millimeter-wave radar, or can be configured using a combination thereof. The front left-side sensor 21A detects the obstacles that may make accidental contact with the vehicle and that have a height from the ground. For example, the front left-side sensor 21A detects the obstacles within a distance of about 5 meters from the vehicle. In the vertical view, the front left-side sensor 21A detects the obstacles present in, for example, a range of about 40° centering around its center. A detection range of the front left-side sensor 21A may partially overlap with a detection range of the front center sensor 21B. The front left-side sensor 21A outputs obstacle information of each of the detected obstacles to an obstacle information obtaining unit 43 of the bird's-eye view video generation device 40. As an example, the obstacle information contains the followings: an indication about presence or absence of an obstacle in the detection range of the front left-side sensor 21A; a distance to the obstacle; and an existing range of the obstacle in a horizontal direction.

The front center sensor 21B is installed in a front center of the vehicle for detecting the obstacles present in the front center of the vehicle. For example, the front center sensor 21B can be an infrared sensor, or an ultrasonic sensor, or millimeter-wave radar, or can be configured using a combination thereof. The front center sensor 21B detects the obstacles that may make accidental contact with the vehicle and that have a height from the ground. For example, the front center sensor 21B detects the obstacles within a distance of about 5 meters from the vehicle. In the vertical view, the front center sensor 21B detects the obstacles present in, for example, a range of about 40° centering around its center. A detection range of the front center sensor 21B may partially overlap with the detection range of the front left-side sensor 21A and the front right-side sensor 21C. The front center sensor 21B outputs the obstacle information of each of the detected obstacles to the obstacle information obtaining unit 43 of the bird's-eye view video generation device 40. As an example, the obstacle information contains the followings: the indication about the presence or absence of the obstacle in the detection range of the front center sensor 21B; the distance to the obstacle; and the existing range of the obstacle in the horizontal direction.

The front right-side sensor 21C is installed in the front right-side of the vehicle for detecting the obstacles present in the front right-side of the vehicle. For example, the front right-side sensor 21C can be an infrared sensor, or an ultrasonic sensor, or millimeter-wave radar, or can be configured using a combination thereof. The front right-side sensor 21C detects the obstacles that may make accidental contact with the vehicle and that have a height from the ground. For example, the front right-side sensor 21C detects the obstacles within a distance of about 5 meters from the vehicle. In the vertical view, the front right-side sensor 21C detects the obstacles present in, for example, the range of about 40° centering around its center. A detection range of the front right-side sensor 21C may partially overlap with the detection range of the front center sensor 21B. The front right-side sensor 21C outputs the obstacle information of each of the detected obstacles to the obstacle information obtaining unit 43 of the bird's-eye view video generation device 40. As an example, the obstacle information contains the followings: the indication about the presence or absence of the obstacle in the detection range of the front right-side sensor 21C; the distance to the obstacle; and the existing range of the obstacle in the horizontal direction.

Thus, using the front left-side sensor 21A, the front center sensor 21B, and the front right-side sensor 21C, the obstacles present in the front side of the vehicle are detected.

The rear left-side sensor 22A is installed in a rear left-side of the vehicle for detecting the obstacles present in the rear left-side of the vehicle. For example, the rear left-side sensor 22A can be an infrared sensor, or an ultrasonic sensor, or millimeter-wave radar, or can be configured using a combination thereof. The rear left-side sensor 22A detects the obstacles that may make accidental contact with the vehicle and that have a height from the ground. For example, the rear left-side sensor 22A detects the obstacles within a distance of about 5 meters from the vehicle. In the vertical view, the rear left-side sensor 22A detects the obstacles present in, for example, the range of about 40° centering around its center. A detection range of the rear left-side sensor 22A may partially overlap with a detection range of the rear center sensor 22B. The rear left-side sensor 22A outputs the obstacle information of each of the detected obstacles to the obstacle information obtaining unit 43 of the bird's-eye view video generation device 40. As an example, the obstacle information contains the followings: the indication about the presence or absence of the obstacle in the detection range of the rear left-side sensor 22A; the distance to the obstacle; and the existing range of the obstacle in the horizontal direction.

The rear center sensor 22B is installed in a rear center of the vehicle for detecting the obstacles present in the rear center of the vehicle. For example, the rear center sensor 22B can be an infrared sensor, or an ultrasonic sensor, or millimeter-wave radar, or can be configured using a combination thereof. The rear center sensor 22B detects the obstacles that may make accidental contact with the vehicle and that have a height from the ground. For example, the rear center sensor 22B detects the obstacles within a distance of about 5 meters from the vehicle. In the vertical view, the rear center sensor 22B detects the obstacles present in, for example, the range of about 40° centering around its center. A detection range of the rear center sensor 22B may partially overlap with the detection range of the rear left-side sensor 22A and the rear right-side sensor 22C. The rear center sensor 22B outputs the obstacle information of each of the detected obstacles to the obstacle information obtaining unit 43 of the bird's-eye view video generation device 40. As an example, the obstacle information contains the followings: the indication about the presence or absence of the obstacle in the detection range of the rear center sensor 22B; the distance to the obstacle; and the existing range of the obstacle in the horizontal direction.

The rear right-side sensor 22C is installed in a rear right-side of the vehicle for detecting the obstacles present in the rear right-side of the vehicle. For example, the rear right-side sensor 22C can be an infrared sensor, or an ultrasonic sensor, or millimeter-wave radar, or can be configured using a combination thereof. The rear right-side sensor 22C detects the obstacles that may make accidental contact with the vehicle and that have a height from the ground. For example, the rear right-side sensor 22C detects the obstacles within a distance of about 5 meters from the vehicle. In the vertical view, the rear right-side sensor 22C detects the obstacles present in, for example, the range of about 40° centering around its center. A detection range of the rear right-side sensor 22C may partially overlap with the detection range of the rear center sensor 22B. The rear right-side sensor 22C outputs the obstacle information of each of the detected obstacles to the obstacle information obtaining unit 43 of the bird's-eye view video generation device 40. As an example, the obstacle information contains the followings: the indication about the presence or absence of the obstacle in the detection range of the rear right-side sensor 22C; the distance to the obstacle; and the existing range of the obstacle in the horizontal direction.

Thus, using the rear left-side sensor 22A, the rear center sensor 22B, and the rear right-side sensor 22C, the obstacles present in the rear side of the vehicle are detected.

The display panel 31 is a display such as an LCD (Liquid Crystal Display) or an organic EL (Organic Electro-Luminescence) display. The display panel 31 is used to display the bird's-eye view video 100 based on video signals output from the bird's-eye view video generation device 40 of the bird's-eye view video generation system 1. Herein, the display panel 31 either can be a dedicated display panel for the bird's-eye view video generation system 1, or can be a display panel used in a shared manner with other systems such as a navigation system. The display panel 31 is disposed at an easily visible position for a driver.

The bird's-eye view video generation device 40 includes a controller 41 and a storage 49.

The controller 41 is an arithmetic processing device configured using, for example, a CPU (Central Processing Unit). The controller 41 loads a program, which is stored in the storage 49, into a memory and executes the commands written in the program. The controller 41 includes the video capturing unit 42, the obstacle information obtaining unit 43, a vehicle information obtaining unit 44, an bird's-eye view video generating unit (video generating unit) 46, a superimposed video generating unit (video generating unit) 47, and a display controller 48.

The video capturing unit 42 captures surrounding videos in which the surrounding of the vehicle is imaged. More specifically, the video capturing unit 42 captures the videos output by the front camera 11, the rear camera 12, the left-side camera 13, and the right-side camera 14. Then, the video capturing unit 42 outputs the captured videos to the bird's-eye view video generating unit 46.

The obstacle information obtaining unit 43 obtains the obstacle information of the obstacles detected around the vehicle. In the first embodiment, the obstacle information obtaining unit 43 obtains the obstacle information that contains the distance to each of the detected obstacles. More specifically, the obstacle information obtaining unit 43 obtains the obstacle information output by the front left-side sensor 21A, the front center sensor 21B, the front right-side sensor 21C, the rear left-side sensor 22A, the rear center sensor 22B, and the rear right-side sensor 22C. Then, the obstacle information obtaining unit 43 outputs the obtained obstacle information to the superimposed video generating unit 47.

The vehicle information obtaining unit 44 obtains vehicle information, such as gear operation information of the vehicle, that represents a trigger for displaying the bird's-eye view video, from a CAN (Controller Area Network) and various sensors for sensing condition of the vehicle. Then, the vehicle information obtaining unit 44 outputs the obtained vehicle information to the bird's-eye view video generating unit 46.

The bird's-eye view video generating unit 46 generates the bird's-eye view video 100 by performing viewpoint conversion with respect to the surrounding videos obtained by the video capturing unit 42 so that the vehicle is viewed from above. More specifically, the bird's-eye view video generating unit 46 generates the bird's-eye view video 100 based on the videos captured by the front camera 11, the rear camera 12, the left-side camera 13, and the right-side camera 14. As far as the method for generating the bird's-eye view video 100 is concerned, any known method can be implemented without restriction. Subsequently, the bird's-eye view video generating unit 46 outputs the generated bird's-eye view video 100 to the display controller 48.

Figure 2:
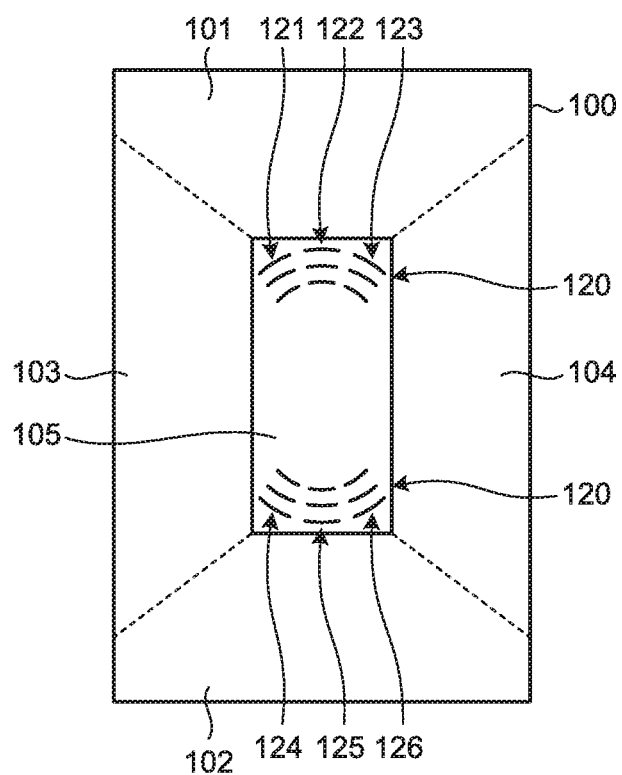
FIG. 2 is a diagram illustrating a bird's-eye view video and obstacle notification icons generated in the bird's-eye view video generation system according to the first embodiment.

Explained below with reference to FIG. 2 is the bird's-eye view video 100. FIG. 2 is a diagram illustrating a bird's-eye view video and obstacle notification icons generated in the bird's-eye view video generation system according to the first embodiment. The bird's-eye view video 100 has a vertically-long rectangle shape. Moreover, the bird's-eye view video 100 includes an front video 101, a rear video 102, a left-side video 103, a right-side video 104, and a center video 105 that is positioned in a center portion enclosed by the front video 101, the rear video 102, the left-side video 103, and the right-side video 104. The front video 101, the rear video 102, the left-side video 103, the right-side video 104, and the center video 105 can be partitioned by frame-like boundary lines.

The center video 105 is generated in a vertically-long rectangular shape. The boundaries of the center video 105 with the front video 101, the rear video 102, the left-side video 103, and the right-side video 104 are demarcated by lines. Herein, the center video 105 indicates a position of the vehicle in the bird's-eye view video 100.

In FIG. 2, the dashed lines indicating the boundaries of the front video 101, the rear video 102, the left-side video 103, and the right-side video 104 are illustrated only for purpose of an explanation. Actually, in the bird's-eye view video 100 displayed in the display panel 31, the dashed lines are not displayed. The same applies to the other drawings too.

The superimposed video generating unit 47 generates the bird's-eye view video 100 in which the obstacles information is superimposed on the center video 105 based on the obstacle information obtained by the obstacle information obtaining unit 43. In the first embodiment, based on the obstacle information obtained by the obstacle information obtaining unit 43, the superimposed video generating unit 47 generates the bird's-eye view video 100 in which information indicating directions of the detected obstacles is superimposed on the center video 105. In the first embodiment, the superimposed video generating unit 47 uses obstacle notification icons (obstacle information) 120 to illustrate the information about directions of the detected obstacles. The obstacle notification icons 120 schematically indicate detecting directions of the sensors for detecting the obstacles in a horizontal direction, and orientations of the plurality of the arcs correspond to the detecting direction originating from installation positions of the sensors or radial orientations centering around the vehicle. A width of the arc constituting the obstacle notification icon 120 can indicate the detection range of the corresponding sensor for detecting the obstacles, or can be set to a fixed width corresponding to the detecting direction regardless of the detection range of the sensor.

Each of the obstacle notification icons 120 is an icon for notifying about the obstacles. Moreover, each of the obstacle notification icons 120 indicates the distance to the obstacle and the direction of the obstacle. Each of the obstacle notification icons 120 include a front left-side icon (obstacle information) 121, a front center icon (obstacle information) 122, a front right-side icon (obstacle information) 123, a rear left-side icon (obstacle information) 124, a rear center icon (obstacle information) 125, and a rear right-side icon (obstacle information) 126.

The front left-side icon 121 is an icon for notifying about the obstacle present in the front left-side of the vehicle. More specifically, the front left-side icon 121 is an icon for notifying about the detection of the obstacle by the front left-side sensor 21A. With reference to FIG. 2, the front left-side icon 121 is superimposed on the top left portion of the center video 105 in the bird's-eye view video 100.

In the first embodiment, the front left-side icon 121 is made of triple arc-shaped curve lines that project toward the outside of the bird's-eye view video 100. Moreover, a radius of the triple arc-shaped curve line reduces from the outer side of the bird's-eye view video 100 toward the center of the bird's-eye view video 100. Furthermore, a length of the triple arc-shaped curve line reduces from the outer side of the bird's-eye view video toward the center of the bird's-eye view video 100.

The front left-side icon 121 can be varied in color according to the distance to the obstacle. For example, if the distance to the obstacle is equal to or longer than a first predetermined distance, then the front left-side icon 121 is displayed in green color. If the distance to the obstacle is shorter than the first predetermined distance but is equal to or longer than a second predetermined distance, then the front left-side icon 121 is displayed in yellow color. If the distance to the obstacle is shorter than the second predetermined distance, then the front left-side icon 121 is displayed in red color.

Moreover, the front left-side icon 121 can be varied in the number of arc-like curved lines according to the distance to the obstacle. For example, if the distance to the obstacle is equal to or longer than the first predetermined distance, then the front left-side icon 121 is displayed using only the outermost arc-like curved line among the triple circular arc-like curved lines. If the distance to the obstacle is shorter than the first predetermined distance but is equal to or longer than the second predetermined distance, then the front left-side icon 121 is displayed using the outermost arc-like curved line and the middle arc-like curved line among the triple circular arc-like curved lines. If the distance to the obstacle is shorter than the second predetermined distance, then the front left-side icon 121 is displayed using all of the triple circular arc-like curved lines.

The front center icon 122 is an icon for notifying about the obstacle present in the front center portion of the vehicle. More specifically, the front center icon 122 is an icon for notifying about the detection of the obstacle by the front center sensor 21B. With reference to FIG. 2, the front center icon 122 is superimposed on the top center portion of the center video 105 in the bird's-eye view video 100. The front center icon 122 is configured in an identical manner to the front left-side icon 121.

The front right-side icon 123 is an icon for notifying about the obstacle present in the front right-side of the vehicle. More specifically, the front right-side icon 123 is an icon for notifying about the detection of the obstacle by the front right-side sensor 21C. With reference to FIG. 2, the front right-side icon 123 is superimposed on the top right portion of the center video 105 in the bird's-eye view video 100. The front right-side icon 123 is configured in an identical manner to the front left-side icon 121.

The rear left-side icon 124 is an icon for notifying about the obstacle present in the rear left-side of the vehicle. More specifically, the rear left-side icon 124 is an icon for notifying about the detection of the obstacle by the rear left-side sensor 22A. With reference to FIG. 2, the rear left-side icon 124 is superimposed on the bottom left portion of the center video 105 in the bird's-eye view video 100. The rear left-side icon 124 is configured in an identical manner to the front left-side icon 121.

The rear middle icon 125 is an icon for notifying about the obstacle present in the rear center portion of the vehicle. More specifically, the rear middle icon 125 is an icon for notifying about the detection of the obstacle by the rear center sensor 22B. With reference to FIG. 2, the rear middle icon 125 is superimposed on the bottom center portion of the center video 105 in the bird's-eye view video 100. The rear middle icon 125 is configured in an identical manner to the front left-side icon 121.

The rear right-side icon 126 is an icon for notifying about the obstacle present in the rear right-side portion of the vehicle. More specifically, the rear right-side icon 126 is an icon for notifying about the detection of the obstacle by the rear right-side sensor 22C. With reference to FIG. 2, the rear right-side icon 126 is superimposed on the bottom right portion of the center video 105 in the bird's-eye view video 100. The rear right-side icon 126 is configured in an identical manner to the front left-side icon 121.

The display controller 48 displays the bird's-eye view video 100, which is generated by the superimposed video generating unit 47, in the display panel 31.

The storage 49 is used to store data required in various operations performed in the bird's-eye view video generation device 40, and to store various operation results. For example, the storage 49 can be a semiconductor memory device such as a RAM (Random Access Memory), a ROM (Read Only Memory), or a flash memory, or can be a memory device such as a hard disc or an optical disc.

Figure 3:
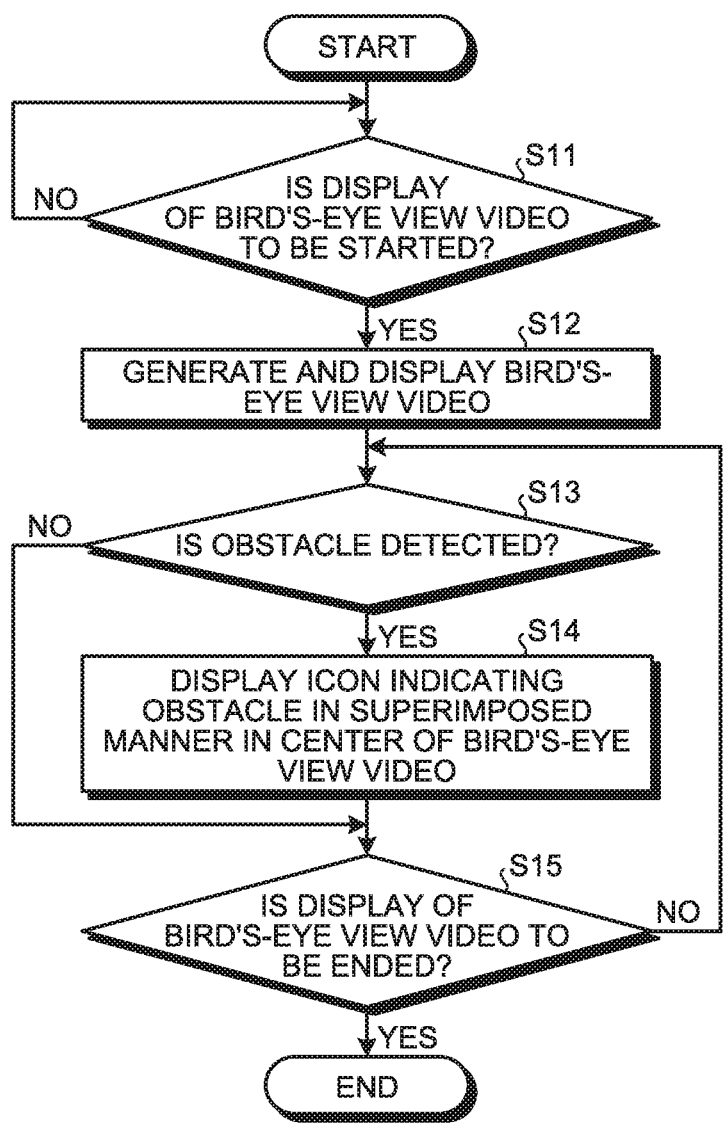
FIG. 3 is a flowchart for explaining a flow of operations performed in a bird's-eye view video generation device of the bird's-eye view video generation system according to the first embodiment.

Explained below with reference to FIG. 3 is a flow of processes performed in the bird's-eye view video generation device 40 of the bird's-eye view video generation system 1. FIG. 3 is a flowchart for explaining a flow of operations performed in the bird's-eye view video generation device of the bird's-eye view video generation system according to the first embodiment.

The controller 41 determines whether or not to start display of the bird's-eye view video (Step S11). As an example of the determination to start the display of the bird's-eye view video, the controller 41 determines whether or not to start the display of the bird's-eye view video based on presence or absence of a backward movement trigger. Herein, the backward movement trigger implies, for example, a case in which a gearshift lever is set to "reverse". Alternatively, the backward movement trigger implies a case in which the travelling direction of the vehicle corresponds to a direction toward the rear side of the vehicle. If there is no backward movement trigger, then the controller 41 determines not to start the display of the bird's-eye view video (No at Step S11), and again performs the process at Step S11. When there is a backward movement trigger, the controller 41 determines to start the display of the bird's-eye view video (Yes at Step S11), and the system control proceeds to Step S12.

The controller 41 generates to display the bird's-eye view video 100 (Step S12). More specifically, the controller 41 makes the bird's-eye view video generating unit 46 generate the bird's-eye view video 100 by performing a viewpoint conversion with respect to the surrounding videos obtained by the video capturing unit 42 so that the vehicle is viewed from above. Then, the controller 41 makes the display controller 48 display the generated bird's-eye view video 100 in the display panel 31.

The controller 41 determines whether or not an obstacle is detected (Step S13). More specifically, the controller 41 determines whether or not the obstacle information obtaining unit 43 has obtained obstacle information. If it is determined that the obstacle information obtaining unit 43 has obtained the obstacle information (Yes at Step S13), then the system control proceeds to Step S14. If it is determined that the obstacle information obtaining unit 43 has not obtained the obstacle information (No at Step S13), then the system control proceeds to Step S15.

The controller 41 displays the obstacle notification icons 120, which indicate the obstacles, in the center portion of the bird's-eye view video 100 (Step S14). More specifically, based on the obstacle information obtained by the obstacle information obtaining unit 43, the controller 41 makes the superimposed video generating unit 47 generate the bird's-eye view video 100 in which the obstacle notification icon 120 is superimposed on the center video 105 so as to indicate a direction of the detected obstacle. Then, the controller 41 makes the display controller 48 display the generated bird's-eye view video 100 in the display panel 31.

If the obstacle information is obtained from a plurality of sensors including the front left-side sensor 21A, the front center sensor 21B, the front right-side camera 21C, the rear left-side sensor 22A, the rear center sensor 22B, and the rear right-side sensor 22C, then the controller 41 makes the superimposed video generating unit 47 generate the bird's-eye view video 100 in which a plurality of the obstacle notification icons 120 is superimposed on the center video 105.

The controller 41 determines whether or not to end the display of the bird's-eye view video (Step S15). More specifically, based on the presence or absence of the backward movement trigger, the controller 41 determines whether or not to end the display of the bird's-eye view video. If there is no backward movement trigger, in other words, if the backward movement trigger has been released, the controller 41 determines to end the display of the bird's-eye view video (Yes at Step S15), and ends the process. However, if there is a backward movement trigger, then the controller 41 determines not to end the display of the bird's-eye view video (No at Step S15), and again performs the process at Step S13.

In this way, in the bird's-eye view video generation system 1, when the obstacle is detected, the obstacle notification icon 120 indicating the direction of the detected obstacle is superimposed on the center portion of the bird's-eye view video 100 and video signals are output to the display panel 31. Based on the video signals output from the bird's-eye view video generation system 1, the display panel 31 displays the bird's-eye view video 100 along with, for example, a navigation screen.

Figure 4:
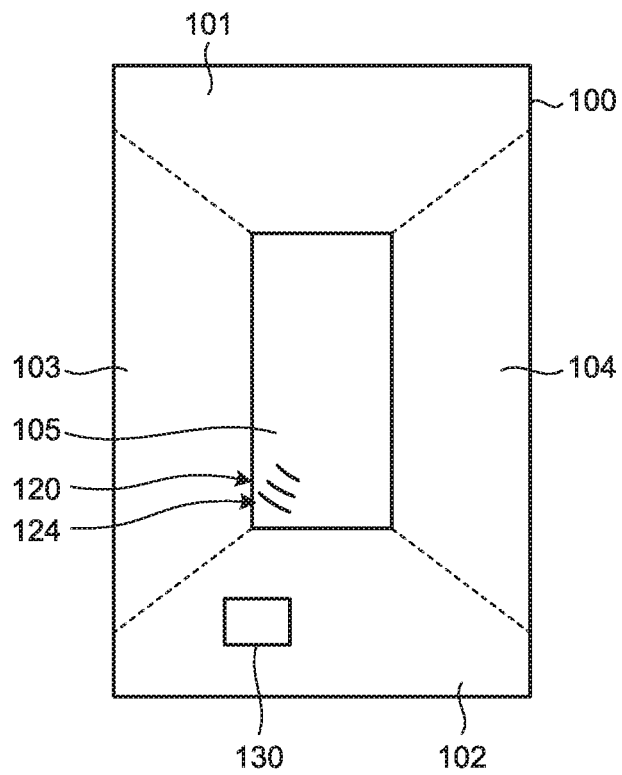
FIG. 4 is a diagram illustrating an example of the bird's-eye view video generated in the bird's-eye view video generation system according to the first embodiment.

In FIG. 4 is illustrated an example in which an obstacle is detected in the rear left-side during the backward movement of the vehicle. FIG. 4 is a diagram illustrating an example of the bird's-eye view video generated in the bird's-eye view video generation system according to the first embodiment. With reference to FIG. 4, in the rear video 102 of the bird's-eye view video 100 is included an obstacle video 130 of the obstacle present in the rear left-side.

At Step S13, the controller 41 determines that an obstacle is detected. Then, at Step S14, based on the obstacle information obtained by the obstacle information obtaining unit 43, the controller 41 makes the superimposed video generating unit 47 generate the bird's-eye view video 100 in which the obstacle notification icon 120 indicating the rear left-side direction, in which the obstacle is detected, is superimposed on the center video 105. Subsequently, the controller 41 makes the display controller 48 display the generated bird's-eye view video 100 in the display panel 31.

Figure 5:
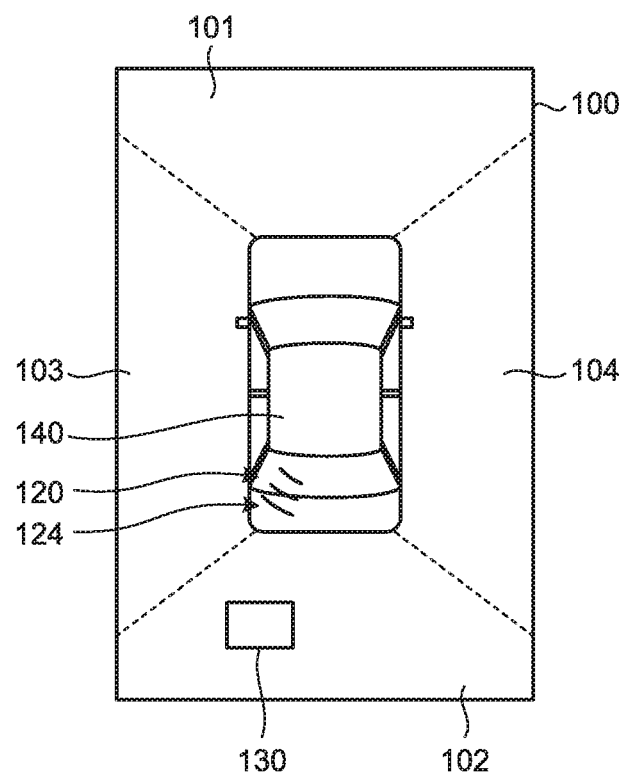
FIG. 5 is a diagram illustrating another example of the bird's-eye view video generated in the bird's-eye view video generation system according to the first embodiment.

In FIG. 5 is illustrated an example in which an obstacle is detected in the rear left-side during the backward movement of the vehicle. FIG. 5 is a diagram illustrating another example of the bird's-eye view video generated in the bird's-eye view video generation system according to the first embodiment.

With reference to FIG. 5, in the center video 105 of the bird's-eye view video 100, a vehicle icon 140 represents an icon of the own vehicle when the vehicle is viewed from above. At Step S14, the controller 41 makes the superimposed video generating unit 47 generate the bird's-eye view video 100 in which the obstacle notification icon 120 indicating the rear left-side direction, in which the obstacle is detected, is superimposed on the own vehicle icon 140.

As described above, in the first embodiment, when the obstacle is detected around the vehicle, the bird's-eye view video 100, in which the obstacle notification icon 120 indicating the direction of the detected obstacle is superimposed on the center video 105, is displayed in the display panel 31. In the first embodiment, since the obstacle notification icon 120 is superimposed on the center video 105 of the bird's-eye view video 100, the obstacle notification icon 120 does not overlap with the obstacle appearing in the bird's-eye view video 100. In other words, in the first embodiment, the obstacle can be distinctly displayed without causing a loss of visibility of the obstacle appearing in the bird's eye view video 100. In this way, in the first embodiment, it becomes possible to properly confirm the obstacles present around the vehicle.

In the first embodiment, using each obstacle notification icon 120, the direction of the detected obstacle and the distance to the obstacle can be notified.

In the first embodiment, as illustrated in FIG. 4, when the own vehicle icon 140 is not displayed in the center video 105 of the bird's-eye view video 100, the visibility of the obstacle notification icons 120 can be enhanced. In this way, in the first embodiment, the obstacles present around the vehicle can be confirmed in a more proper manner.

In the first embodiment, as illustrated in FIG. 5, the own vehicle icon 140 can be displayed in the center video 105 of the bird's-eye view video 100. As a result, in the first embodiment, it becomes possible to display the bird's-eye view video 100 that enables easier recognition of the directions of the detected obstacles with respect to the vehicle. In this way, in the first embodiment, the obstacles present around the vehicle can be confirmed in a more proper manner.

[Second Embodiment]

Figure 6:
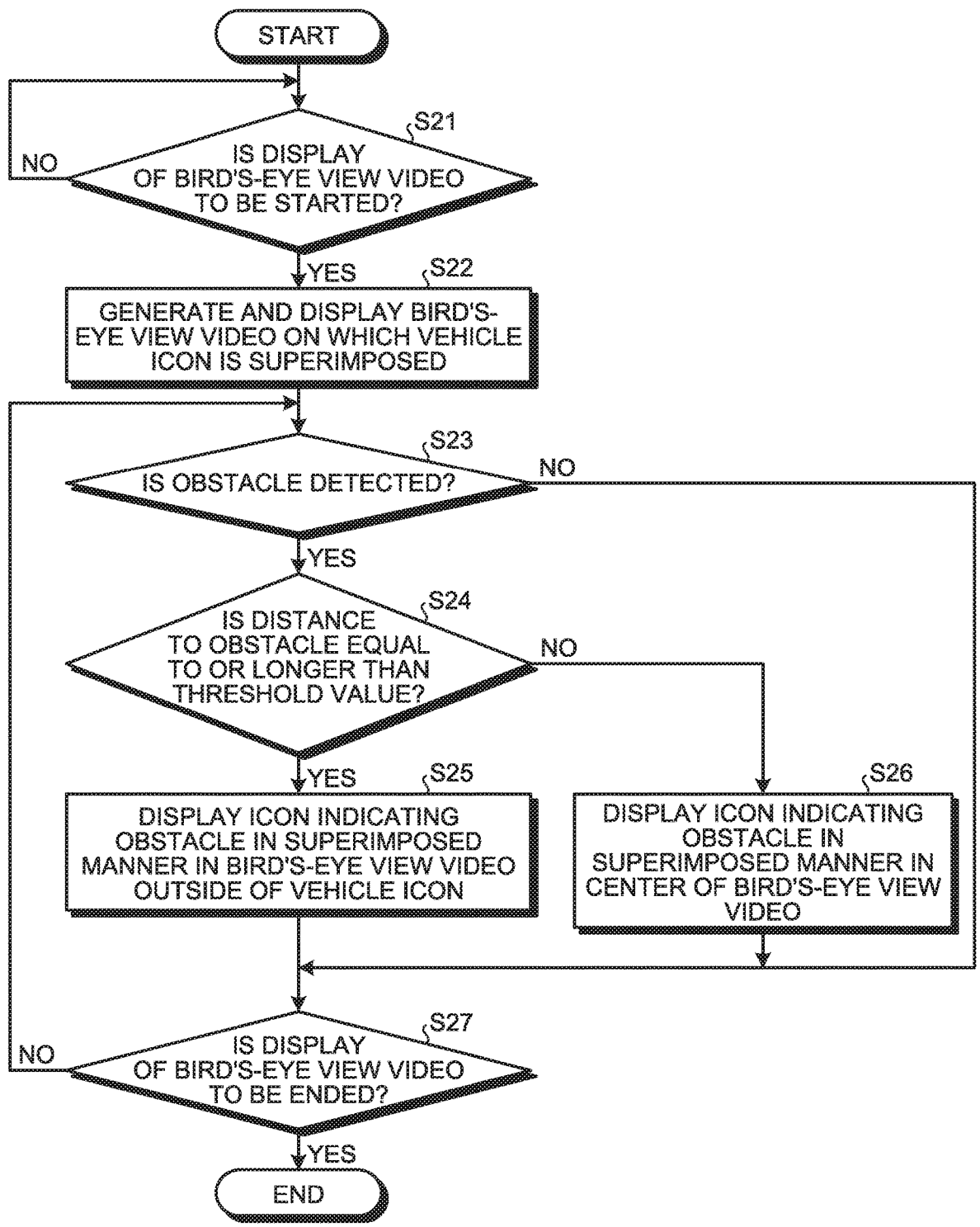
FIG. 6 is a flowchart for explaining a flow of operations performed in the bird's-eye view video generation device of the bird's-eye view video generation system according to a second embodiment.
Figure 7:
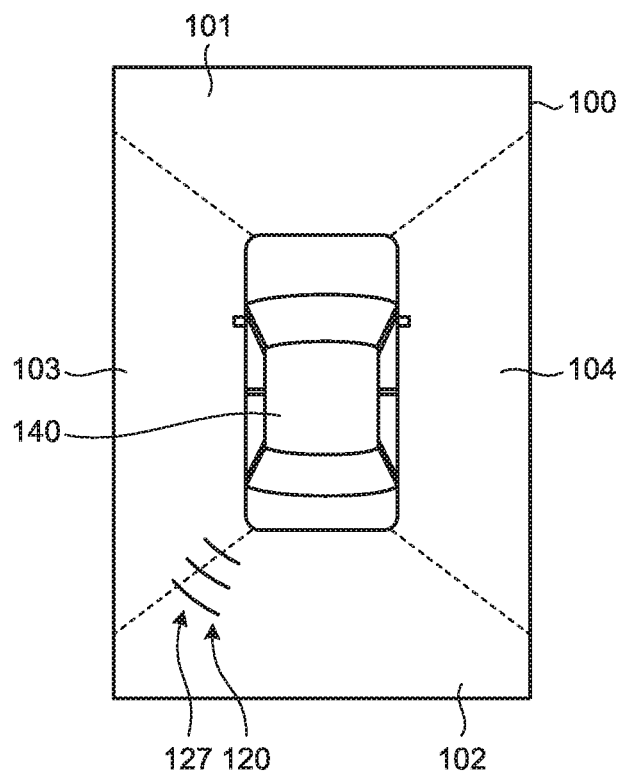
FIG. 7 is a diagram illustrating a diagram illustrating an example of the bird's-eye view video generated in the bird's-eye view video generation system according to the second embodiment.

Explained below with reference to FIGS. 6 and 7 is the bird's-eye view video generation system according to a second embodiment. FIG. 6 is a flowchart for explaining a flow of operations performed in the bird's-eye view video generation device of the bird's-eye view video generation system according to the second embodiment. FIG. 7 is a diagram illustrating a diagram illustrating an example of the bird's-eye view video generated in the bird's-eye view video generation system according to the second embodiment. The bird's-eye view video generation system 1 has an identical fundamental configuration to the bird's-eye view video generation system 1 according to the first embodiment. In the following explanation, the identical constituent elements in the bird's-eye view video generation system 1 are referred to by the same or equivalent reference numerals, and the detailed explanation of those constituent elements is not given again. In the bird's-eye view video generation system 1 according to the second embodiment, the operations performed by the obstacle information obtaining unit 43, the superimposed video generating unit 47, and the controller 41 of the bird's-eye view video generation device 40 are different from the processes performed in the bird's-eye view video generation system 1 according to the first embodiment.

In addition to including the front left-side icon 121, the front center icon 122, the front right-side icon 123, the rear left-side icon 124, the rear center icon 125, and the rear right-side icon 126 according to the first embodiment, the obstacle notification icons 120 include a second front left-side icon (obstacle information), a second front center icon (obstacle information), a second front right-side icon (obstacle information), a second rear left-side icon (obstacle information), a second rear center icon (obstacle information), and a second rear right-side icon (obstacle information). In FIG. 7, the second front left-side icon, the second front center icon, the second front right-side icon, the second rear center icon, and the second rear right-side icon are not illustrated, and only the second rear left-side icon (obstacle information) is illustrated.

The front left-side icon 121 is an icon for notifying about the obstacle that is present in the front left-side of the vehicle and that is at a shorter distance than a threshold value. More specifically, the front left-side icon 121 is an icon for notifying about the detection of the obstacle, which is at a shorter distance than the threshold value, by the front left-side sensor 21A.

The front center icon 122 is an icon for notifying about the obstacle that is present in the front center portion of the vehicle and that is at a shorter distance than the threshold value. More specifically, the front center icon 122 is an icon for notifying about the detection of the obstacle, which is at a shorter distance than the threshold value, by the front center sensor 21B.

The front right-side icon 123 is an icon for notifying about the obstacle that is present in the front right-side of the vehicle and that is at a shorter distance than the threshold value. More specifically, the front right-side icon 123 is an icon for notifying about the detection of an obstacle, which is at a shorter distance than the threshold value, by the front right-side sensor 21C.

The rear left-side icon 124 is an icon for notifying about the obstacle that is present in the rear left-side of the vehicle and that is at a shorter distance than the threshold value. More specifically, the rear left-side icon 124 is an icon for notifying about the detection of the obstacle, which is at a shorter distance than the threshold value, by the rear left-side sensor 22A.

The rear center icon 125 is an icon for notifying about the obstacle that is present in the rear center portion of the vehicle and that is at a shorter distance than the threshold value. More specifically, the rear middle icon 125 is an icon for notifying about the detection of the obstacle, which is at a shorter distance than the threshold value, by the rear center sensor 22B.

The rear right-side icon 126 is an icon for notifying about the obstacle that is present in the rear right-side of the vehicle and that is at a shorter distance than the threshold value. More specifically, the rear right-side icon 126 is an icon for notifying about the detection of the obstacle, which is at a shorter distance than the threshold value, by the rear right-side sensor 22C.

The second front left-side icon is an icon for notifying about the obstacle that is present in the front left-side of the vehicle and that is at a distance equal to or longer than the threshold value. More specifically, the second front left-side icon is an icon for notifying about the detection of the obstacle, which is at a distance equal to or longer than the threshold value, by the front left-side sensor 21A. The second front left-side icon is superimposed on the top left portion located outside of the center video 105 of the bird's-eye view video 100. The second front left-side icon is configured in an identical manner to the front left-side icon 121.

The second front center icon is an icon for notifying about the obstacle that is present in the front center portion of the vehicle and that is at a distance equal to or longer than the threshold value. More specifically, the second front center icon is an icon for notifying about the detection of the obstacle, which is at a distance equal to or longer than the threshold value, by the front center sensor 21B. The second front center icon is superimposed on the top center portion located outside of the center video 105 of the bird's-eye view video 100. The second front center icon is configured in an identical manner to the front left-side icon 121.

The second front right-side icon is an icon for notifying about the obstacle that is present in the front right-side of the vehicle and that is at a distance equal to or longer than the threshold value. More specifically, the second front right-side icon is an icon for notifying about the detection of the obstacle, which is at a distance equal to or longer than the threshold value, by the front right-side sensor 21C. The second front right-side icon is superimposed on the top right portion located outside of the center video 105 of the bird's-eye view video 100. The second front right-side icon is configured in an identical manner to the front left-side icon 121.

The second rear left-side icon is an icon for notifying about the obstacle that is present in the rear left-side of the vehicle and that is at a distance equal to or longer than the threshold value. More specifically, the second rear left-side icon is an icon for notifying about the detection of the obstacle, which is at a distance equal to or longer than the threshold value, by the rear left-side sensor 22A. The second rear left-side icon is superimposed on the bottom left portion located outside of the center video 105 of the bird's-eye view video 100. The second rear left-side icon is configured in an identical manner to the front left-side icon 121.

The second rear center icon is an icon for notifying about the obstacle that is present in the rear center portion of the vehicle and that is at a distance equal to or longer than the threshold value. More specifically, the second rear center icon is an icon for notifying about the detection of the obstacle, which is at a distance equal to or longer than the threshold value, by the rear center sensor 22B. The second rear center icon is superimposed on the bottom center portion located outside of the center video 105 of the bird's-eye view video 100. The second rear center icon is configured in an identical manner to the front left-side icon 121.

The second rear right-side icon is an icon for notifying about the obstacle that is present in the rear right-side of the vehicle and that is at a distance equal to or longer than the threshold value. More specifically, the second rear right-side icon is an icon for notifying about the detection of the obstacle, which is at a distance equal to or longer than the threshold value, by the rear right-side sensor 22C. The second rear right-side icon is superimposed on the bottom right portion located outside of the center video 105 of the bird's-eye view video 100. The second rear right-side icon is configured in an identical manner to the front left-side icon 121.

The obstacle information obtaining unit 43 obtains information containing the distance to each of the detected obstacles. Then, the obstacle information obtaining unit 43 outputs the information containing the distance to the detected obstacle to the superimposed video generating unit 47.

Based on the obstacle information obtained by the obstacle information obtaining unit 43, if the distance to the detected obstacle is equal to or longer than the predetermined threshold value, then the superimposed video generating unit 47 generates the bird's-eye view video 100 in which the own vehicle icon 140 is displayed in the center video 105 and in which the obstacle notification icon 120, which represents the obstacle information, is superimposed on the outside of the center portion.

Based on the obstacle information obtained by the obstacle information obtaining unit 43, if the distance to the detected obstacle is shorter than the predetermined threshold value, then the superimposed video generating unit 47 generates the bird's-eye view video 100 in which the obstacle notification icon 120 is superimposed on the center video 105.

Explained below with reference to FIG. 6 is a flow of processes performed in the bird's-eye view video generation device 40 of the bird's-eye view video generation system. In the flowchart illustrated in FIG. 6, the processes performed at Step S21, Step S23, Step S26, and Step S27 are identical to the processes performed at Step S11, Step S13, Step S14, and Step S15, respectively, illustrated in the flowchart in FIG. 3.

The controller 41 generates to display the bird's-eye view video 100 on which the own vehicle icon 140 is superimposed (Step S22). More specifically, the controller 41 makes the bird's-eye view video generating unit 46 generate the bird's-eye view video 100 by performing the viewpoint conversion with respect to the surrounding videos obtained by the video capturing unit 42 so that the vehicle is viewed from above. Moreover, the controller 41 makes the display controller 48 synthesize the own vehicle icon 140 with a center portion of the generated bird's-eye view video 100. Then, the controller 41 makes the display controller 48 display the generated bird's-eye view video 100 in the display panel 31.

The controller 41 determines whether or not the distance to the obstacle is equal to or longer than a predetermined threshold value (Step S24). More specifically, if the distance to the detected obstacle obtained by the obstacle information obtaining unit 43 is equal to or longer than the threshold value (Yes at S24), then the system control proceeds to Step S25. However, if the distance to the detected obstacle obtained by the obstacle information obtaining unit 43 is shorter than the predetermined threshold value (No at S24), then the system control proceeds to Step S26.

Herein, the predetermined threshold value is set to such a value that the display positions of the second front left-side icon, the second front center icon, the second front right-side icon, the second rear left-side icon, the second rear center icon, and the second rear right-side icon do not overlap with the video of the obstacle in the bird's-eye view video 100. More specifically, the predetermined threshold value can be set to be equal to or longer than a certain distance between the vehicle and the position of the outermost arc-like curved line of each of the second front left-side icon, the second front center icon, the second front right-side icon, the second rear left-side icon, the second rear center icon, and the second rear right-side icon. For example, the predetermined threshold value can be set to about 2 meters.

The controller 41 displays the obstacle notification icon 120 in a superimposed manner on the bird's-eye view video 100 outside of the own vehicle icon 140 (Step S25). More specifically, based on the obstacle information obtained by the obstacle information obtaining unit 43, the controller 41 makes the obstacle information obtaining unit 43 generate the bird's-eye view video 100 in which at least either one of the second front left-side icon, the second front center icon, the second front right-side icon, the second rear left-side icon, the second rear center icon, and the second rear right-side icon is superimposed on the outside of the own vehicle icon 140. Then, the controller 41 makes the display controller 48 display the generated bird's-eye view video 100 in the display panel 31.

In this way, in the bird's-eye view video generation system 1, if the distance to the obstacle is equal to or longer than the predetermined threshold value, then the bird's-eye view video 100 is generated in which at least either one of the second front left-side icon, the second front center icon, the second front right-side icon, the second rear left-side icon, the second rear center icon, and the second rear right-side icon is superimposed on the outside of the own vehicle icon 140, and the video signals are output to the display panel 31. On the other hand, in the bird's-eye view video generation system 1, if the distance to the obstacle is shorter than the predetermined threshold value, then the bird's-eye view video 100 is generated in which at least either one of the front left-side icon 121, the front center icon 122, the front right-side icon 123, the rear left-side icon 124, the rear center icon 125, and the rear right-side icon 126 is superimposed on the center video 105, and the video signals are output to the display panel 31.

In FIG. 7 is illustrated an example in which an obstacle is detected in the rear left-side at a distance equal to or longer than the predetermined threshold value during the backward movement of the vehicle.

At Step S23, the controller 41 determines that the obstacle is detected. Then, at Step S24, the controller 41 determines that the distance to the detected obstacle as obtained by the obstacle information obtaining unit 43 is equal to or longer than the predetermined threshold value (Yes at Step S24). Subsequently, at Step S25, the controller 41 generates the bird's-eye view video 100 as illustrated in FIG. 7 in which the second rear left-side icon 127, which indicates the rear left-side direction in which the obstacle is detected, is superimposed on the outside of the concerned-vehicle icon 140. Then, the controller 41 displays the generated bird's-eye view video 100 in the display panel 31.

As described above, in the second embodiment, if the distance to the obstacle is equal to or longer than the predetermined threshold value, the bird's-eye view video 100 is generated in which the obstacle notification icon 120 is superimposed on the outside of the own vehicle icon 140, and then the bird's-eye view video 100 is displayed in the display panel 31. In the second embodiment, if the distance to the obstacle is equal to or longer than the predetermined threshold value, since the obstacle notification icon 120 is superimposed on the bird's-eye view video 100 on the outside of the own vehicle icon 140, the obstacle notification icon 120 does not overlap with the obstacle appearing in the bird's-eye view video 100. In other words, in the second embodiment, the obstacle can be distinctly displayed without causing a loss of visibility of the obstacle appearing in the bird's-eye view video 100. In this way, in the second embodiment, it becomes possible to properly confirm the obstacles present around the vehicle.

In the second embodiment, if the distance to the obstacle is shorter than the predetermined threshold value, the bird's-eye view video 100 is generated in which the obstacle notification icon 120 is superimposed on the center video 105, and then the bird's-eye view video 100 is displayed in the display panel 31. In the second embodiment, if the distance to the obstacle is shorter than the predetermined threshold value, since the obstacle notification icon 120 is superimposed on the center video 105 of the bird's-eye view video 100, the obstacle notification icon 120 does not overlap with the obstacle appearing in the bird's-eye view video 100. In other words, in the second embodiment, the obstacle can be distinctly displayed without causing a loss of visibility of the obstacle appearing in the bird's-eye view video 100.

In this way, in the second embodiment, the obstacles present around the vehicle can be properly confirmed according to the distances to the obstacles.

In the second embodiment, the display positions of the obstacle notification icons 120 in the bird's-eye view video 100 are varied according to the distances to the obstacles. Hence, in the second embodiment, the distances to the obstacles can be made easier to understand.

[Third Embodiment]

Figure 8:
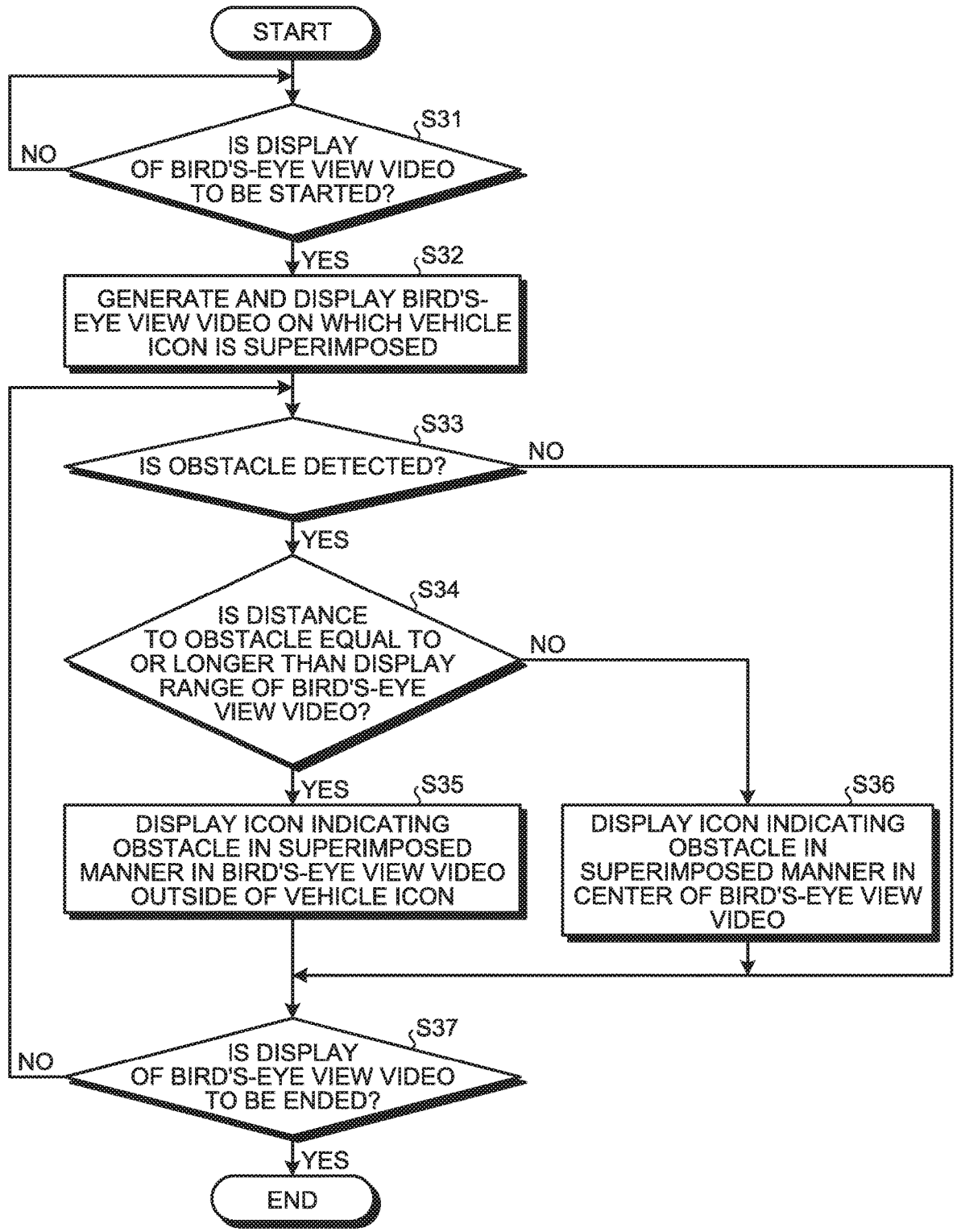
FIG. 8 is a flowchart for explaining a flow of operations performed in the bird's-eye view video generation device of the bird's-eye view video generation system according to a third embodiment.

Explained below with reference to FIG. 8 is the bird's-eye view video generation system 1 according to a third embodiment. FIG. 8 is a flowchart for explaining a flow of processes performed in the bird's-eye view video generation device of the bird's-eye view video generation system according to the third embodiment. In the bird's-eye view video generation system 1 according to the third embodiment, the processes performed by the obstacle information obtaining unit 43, the superimposed video generating unit 47, and the controller 41 of the bird's-eye view video generation device 40 are different from the processes performed in the bird's-eye view video generation system 1 according to the second embodiment.

The detection range of the front left-side sensor 21A, the front center sensor 21B, the front right-side sensor 21C, the rear left-side sensor 22A, the rear center sensor 22B, and the rear right-side sensor 22C is larger than the display range of the bird's-eye view video 100.

The obstacle information obtaining unit 43 obtains the obstacle information of the obstacle that is detected in the range larger than the display range of the bird's-eye view video 100.

Based on the obstacle information obtained by the obstacle information obtaining unit 43, if the distance to the detected obstacle is longer than the display range of the bird's-eye view video 100, then the superimposed video generating unit 47 generates the bird's-eye view video 100 in which the own vehicle icon 140 is displayed in the center portion and in which the obstacle notification icon 120 is superimposed on the outside of the own vehicle icon 140.

Based on the obstacle information obtained by the obstacle information obtaining unit 43, if the distance to the detected obstacle is within the display range of the bird's-eye view video 100, then the superimposed video generating unit 47 generates the bird's-eye view video 100 in which the obstacle notification icon 120 is superimposed on the center video 105 so as to indicate the direction of the detected obstacle.

Explained below with reference to FIG. 8 is a flow of processes performed in the bird's-eye view video generation device 40 of the bird's-eye view video generation system 1. In the flowchart illustrated in FIG. 8, the processes performed from Step S31 to Step S33 and from Step S35 to S37 are identical to the processes performed from Step S21 to Step S23 and from Step S25 to Step S27 illustrated in the flowchart in FIG. 6.

The controller 41 determines whether or not the distance to the obstacle is equal to or longer than the display range of the bird's-eye view video 100 (Step S34). If the distance to the detected obstacle as obtained by the obstacle information obtaining unit 43 is longer than the display range of the bird's-eye view video 100 (Yes at Step S34), then the system control proceeds to Step S35. If the distance to the detected obstacle as obtained by the obstacle information obtaining unit 43 is within the display range of the bird's-eye view video 100 (No at Step S34), then the system control proceeds to Step S36.

In this way, in the bird's-eye view video generation system 1, if the distance to the obstacle is longer than the display range of the bird's-eye view video 100, then the bird's-eye view video 100 is generated in which the obstacle notification icon 120 is superimposed on the outside of the own vehicle icon 140, and then the video signals are output to the display panel 31. On the other hand, in the bird's-eye view video generation system 1, if the distance to the obstacle is within the display range of the bird's-eye view video 100, then the bird's-eye view video 100 is generated in which the obstacle notification icon 120 is superimposed on the center video 105, and then the video signals are output to the display panel 31.

As described above, in the third embodiment, if the distance to the obstacle is longer than the display range of the bird's-eye view video 100, then the bird's-eye view video 100 is generated in which the obstacle notification icon 120 is superimposed on the outside of the own vehicle icon 140, and then the bird's-eye view video 100 is displayed in the display panel. Thus, in the third embodiment, if the distance to the obstacle is longer than the display range of the bird's-eye view video 100, since the obstacle notification icon 120 is superimposed on the outside of the own vehicle icon 140, the obstacle notification icon 120 does not overlap with the obstacle appearing in the bird's-eye view video 100. In other words, in the third embodiment, the obstacle can be distinctly displayed without causing a loss of visibility of the obstacle appearing in the bird's-eye view video 100. In this way, in the third embodiment, it becomes possible to properly confirm the obstacles present around the vehicle.

In the third embodiment, if the distance to the obstacle is within the display range of the bird's-eye view video 100, then the bird's-eye view video 100 is generated in which the obstacle notification icon 120 is superimposed on the center video 105, and then the bird's-eye view video 100 is displayed in the display panel 31. Thus, in the third embodiment, if the distance to the obstacle is within the display range of the bird's-eye view video 100, since the obstacle notification icon 120 is superimposed on the center video 105, the obstacle notification icon 120 does not overlap with the obstacle appearing in the bird's-eye view video 100. In other words, in the third embodiment, the obstacle can be distinctly displayed without causing a loss of visibility of the obstacle appearing in the bird's-eye view video 100.

In this way, in the third embodiment, the obstacles present around the vehicle can be properly confirmed according to the distances to the obstacles.

In the third embodiment, even in a case in which the obstacle is present at a distance longer than the display range of the bird's-eye view video 100, it is possible to display the obstacle notification icon 120. Hence, in the third embodiment, it becomes possible to notify the obstacles present at distances longer than the display range of the bird's-eye view video 100.

[Fourth Embodiment]

Given below is an explanation of the bird's-eye view video generation system 1 according to a fourth embodiment. In the bird's-eye view video generation system 1 according to the fourth embodiment, the processes performed by the superimposed video generating unit 47 and the controller 41 of the bird's-eye view video generation device 40 are different from the processes performed in the bird's-eye view video generation system 1 according to the first embodiment. More specifically, from the bird's-eye view video generation system 1 according to the first embodiment, the bird's-eye view video generation system 1 according to the fourth embodiment differs in the way that, during the determination of whether or not an obstacle is detected, the controller 41 detects an obstacle present in a travelling direction of the vehicle.

Based on the obstacle information obtained by the obstacle information obtaining unit 43, the superimposed video generating unit 47 generates the bird's-eye view video 100 in which the obstacle notification icon 120 for the obstacle present in the travelling direction of the vehicle is superimposed on the center video 105.

Given below is an explanation of the processes performed in the bird's-eye view video generation device 40 of the bird's-eye view video generation system 1.

At Step S13, based on the obstacle information obtained by the obstacle information obtaining unit 43, the controller 41 determines whether or not the obstacle is detected in the travelling direction of the vehicle. If it is determined that the obstacle is detected in the travelling direction of the vehicle (Yes at Step S13), then the system control proceeds to Step S14. If it is determined that the obstacle is not detected in the travelling direction of the vehicle (No at Step S13), then the system control proceeds to Step S15.

In this way, the controller 41 displays the obstacle notification icons 120 for the obstacles approaching the own vehicle and hides the obstacle notification icons 120 for the obstacles moving away.

As described above, in the fourth embodiment, the obstacles present around the vehicle can be confirmed in a more proper manner.

[Fifth Embodiment]

Figure 9:
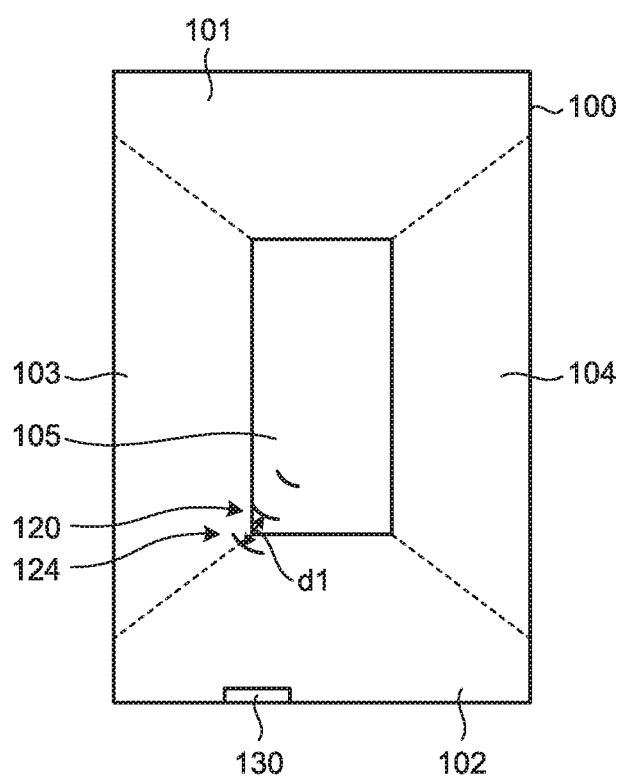
FIG. 9 is a diagram illustrating an example of the bird's-eye view video generated in the bird's-eye view video generation system according to a fifth embodiment.
Figure 10:
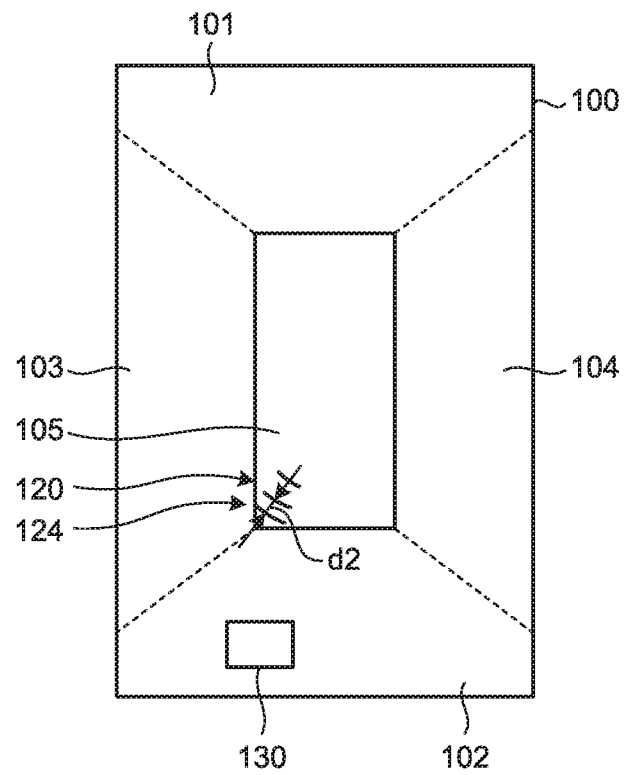
FIG. 10 is a diagram illustrating another example of the bird's-eye view video generated in the bird's-eye view video generation system according to the fifth embodiment.
Figure 11:
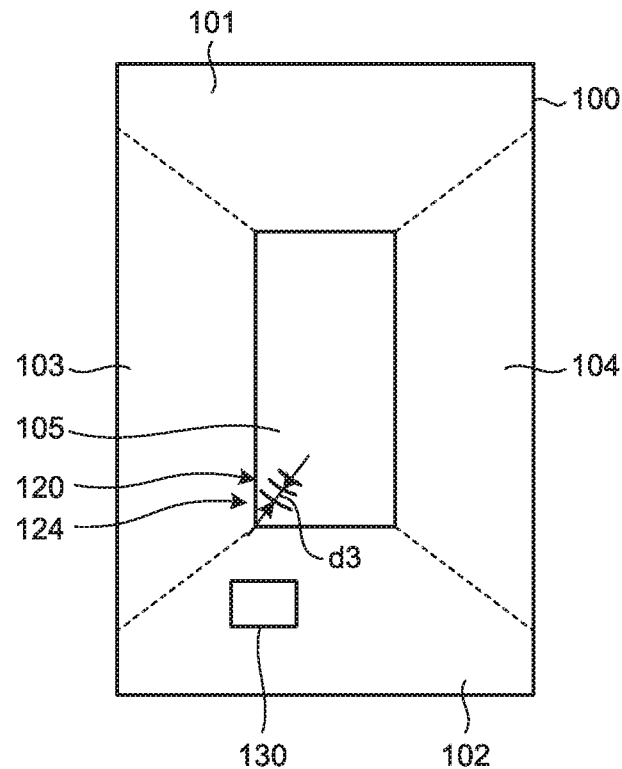
FIG. 11 is a diagram illustrating another example of the bird's-eye view video generated in the bird's-eye view video generation system according to the fifth embodiment.
Figure 12:
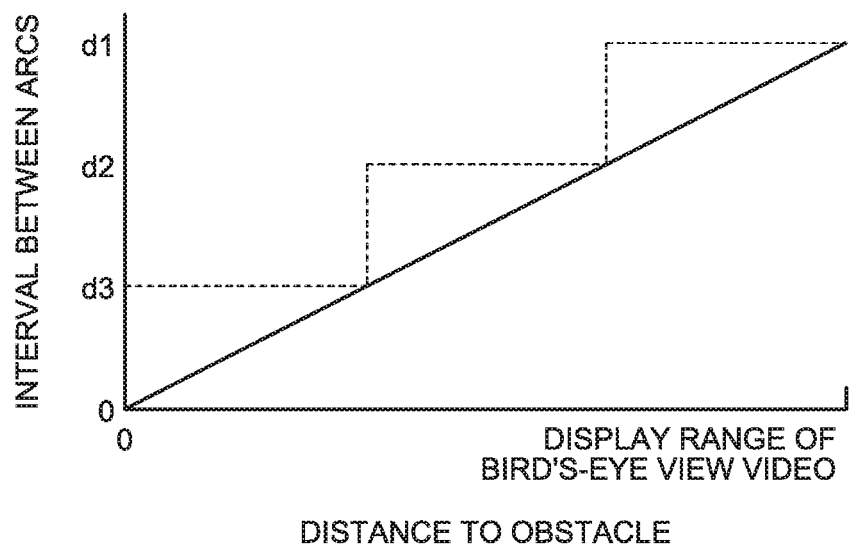
FIG. 12 is a graph illustrating an example of a relationship between an interval between arcs and a distance to the obstacle in an obstacle notification icon.

Explained below with reference to FIGS. 9 to 12 is the bird's-eye view video generation system 1 according to a fifth embodiment. FIG. 9 is a diagram illustrating an example of the bird's-eye view video generated in the bird's-eye view video generation system according to the fifth embodiment. FIG. 10 is a diagram illustrating another example of the bird's-eye view video generated in the bird's-eye view video generation system according to the fifth embodiment. FIG. 11 is a diagram illustrating another example of the bird's-eye view video generated in the bird's-eye view video generation system according to the fifth embodiment. FIG. 12 is a graph illustrating an example of the relationship between an interval between arcs of the obstacle notification icon and the obstacle. In the bird's-eye view video generation system 1 according to the fifth embodiment, the processes performed by the superimposed video generating unit 47 of the bird's-eye view video generation device 40 are different from the processes performed in the bird's-eye view video generation system 1 according to the first embodiment.

As illustrated in FIGS. 9 to 11, the obstacle notification icon 120 includes a plurality of constituent elements oriented in the detection of the detected obstacle, and the distance to the obstacle is indicated by the interval of the constituent elements. In the fifth embodiment, the obstacle notification icon 120 includes triple circular arcs as the constituent elements. In the fifth embodiment, the obstacle notification icon 120 indicates the distance to the obstacle by the interval between the circular arcs. In the fifth embodiment, longer the distance to the obstacle, wider the interval between the circular arcs becomes as indicated by the obstacle notification icon 120. Similarly, shorter the distance to the obstacle, narrower the interval among the circular arcs becomes as indicated by the obstacle notification icon 120.

As illustrated by a solid line in FIG. 12, the interval among the circular arcs of the obstacle notification icon 120 can be set in a linear manner so that the interval becomes wider in proportion to the distance to the obstacle.

Alternatively, as illustrated by a dashed line in FIG. 12, the interval between the circular arcs of the obstacle notification icon 120 can be set in a stepwise manner so that the interval becomes wider in proportion to the distance to the obstacle. More specifically, if the distance to the obstacle is equal to or longer than a first threshold value, for example, if the distance to the obstacle is equal to or longer than 2 meters, then the interval between the circular arcs is set to a first interval d1. Herein, the first threshold value can be set as the distance to a boundary included in the display range of the bird's-eye view video 100. If the distance to the obstacle is equal to or longer than the first threshold value, then the outermost arc-like curved line can be displayed outside of the center video 105 of the bird's-eye view video 100. However, if the distance to the obstacle is shorter than the first threshold value but is equal to or longer than a second threshold value, for example, if the distance to the obstacle is shorter than 2 meters but equal to or longer than 1 meter, then the interval between the circular arcs is set to a second clearance gap d2 that is smaller than the first clearance gap d1. Moreover, if the distance to the obstacle is shorter than the second threshold value, for example, if the distance to the obstacle is shorter than 1 meter, then the interval between the circular arcs is set to a third clearance gap d3 that is smaller than the second clearance gap d2. If the distance to the obstacle becomes still shorter, then the circular arcs can be overlapped by eliminating the interval therebetween.

The distance to the obstacle represents a distance to the obstacle from a sensor for detecting obstacle. Moreover, the distance to the obstacle is almost identical to the distance to the obstacle from the end portion of the vehicle in the direction of the obstacle.

Based on the distance to the detected obstacle obtained by the obstacle information obtaining unit 43, the superimposed video generating unit 47 generates the bird's-eye view video 100 in which the obstacle notification icon 120 with the interval between the circular arcs being changed is superimposed on the center video 105.

Explained below with reference to FIGS. 9 to 11 is an example in which an obstacle is detected in the rear left-side during the backward movement of the vehicle.

For example, explained below with reference to FIG. 9 is an example in which an obstacle is detected in the rear left-side during the backward movement of the vehicle and in which the distance to the obstacle is equal to 2 meters. At Step S14, the controller 41 makes the superimposed video generating unit 47 generate the bird's-eye view video 100 in which the obstacle notification icon 120, in which a direction of the detected obstacle such as the rear left-side is indicated by a protruding direction of the circular arcs and a distance to the detected obstacle is indicated by the interval between the circular arcs, is superimposed on the center video 105. In the obstacle notification icon 120, the interval between the circular arcs is equal to the first interval d1. Thus, the outermost arc-like curved line of the obstacle notification icon 120 is positioned on the outside of the center video 105. The controller 41 makes the superimposed video generating unit 47 display the generated bird's-eye view video 100, which is illustrated in FIG. 9, in the display panel 31. By referring to the interval between the circular arcs of the obstacle notification icon 120 and by the fact that the outermost arc-like curved line is positioned on the outside of the center video 105, it can be understood that the obstacle is present close to the boundary of the display range of the bird's-eye view video 100.

Explained below with reference to FIG. 10 is an example in which an obstacle is detected in the rear left-side during the backward movement of the vehicle and in which the distance to the obstacle is equal to 1.5 meters. At Step S14, the controller 41 makes the superimposed video generating unit 47 generate the bird's-eye view video 100 in which the obstacle notification icon 120, in which the direction of the detected obstacle such as the rear left-side is indicated by the protruding direction of the circular arcs and the distance to the detected obstacle is indicated by the interval between the circular arcs, is superimposed on the center video 105. In the obstacle notification icon 120, the interval between the circular arcs is equal to the second interval d2. The controller 41 makes the superimposed video generating unit 47 display the generated bird's-eye view video 100, which is illustrated in FIG. 10, in the display panel 31. By referring to the interval between the circular arcs of the obstacle notification icon 120, it can be understood that the obstacle is present within the display range of the bird's-eye view video 100.

Explained below with reference to FIG. 11 is an example in which an obstacle is detected in the rear left-side during the backward movement of the vehicle and in which the distance to the obstacle is equal to 1 meter. At Step S14, the controller 41 makes the superimposed video generating unit 47 generate the bird's-eye view video 100 in which the obstacle notification icon 120, in which the direction of the detected obstacle such as the rear left-side is indicated by the protruding direction of the circular arcs and the distance to the detected obstacle is indicated by the interval between the circular arcs, is superimposed on the center video 105. In the obstacle notification icon 120, the interval between the circular arcs is the third interval d3. The controller 41 makes the superimposed video generating unit 47 display the generated bird's-eye view video 100, which is illustrated in FIG. 11, in the display panel 31. By the fact that the interval between the circular arcs of the obstacle notification icon 120 is narrow, it can be understood that the obstacle is present close to the rear end of the vehicle.

In this way, the controller 41 generates the bird's-eye view video 100 in which the obstacle notification icon 120, in which the obstacle notification icon 120 with the interval between the circular arcs being changed based on the distance to the detected obstacle, is superimposed on the center video 105.

As described above, in the fifth embodiment, when the obstacle is detected around the vehicle, the bird's-eye view video 100 is generated in which the obstacle notification icon 120, which indicates the direction of the detected obstacle by the protruding direction of the circular arcs and indicates the distance to the obstacle by the interval between the circular arcs, is superimposed on the center video 105, and then the bird's-eye view video 100 is displayed in the display panel 31. In the fifth embodiment, the direction of the obstacle and the distance to the obstacle can be displayed using the obstacle notification icon 120. In this way, in the fifth embodiment, it becomes possible to properly confirm the obstacles present around the vehicle.

[Sixth Embodiment]

Figure 13:
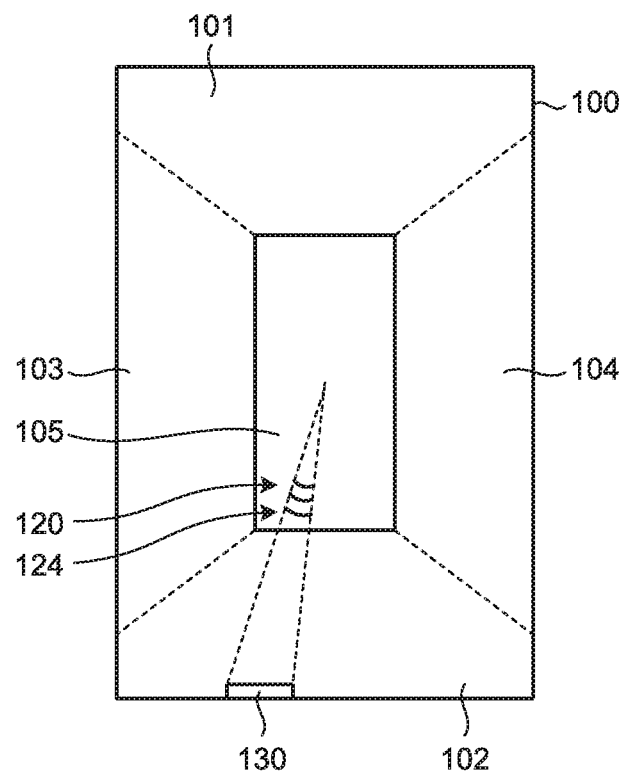
FIG. 13 is a diagram illustrating an example of the bird's-eye view video generated in the bird's-eye view video generation system according to a sixth embodiment.
Figure 14:
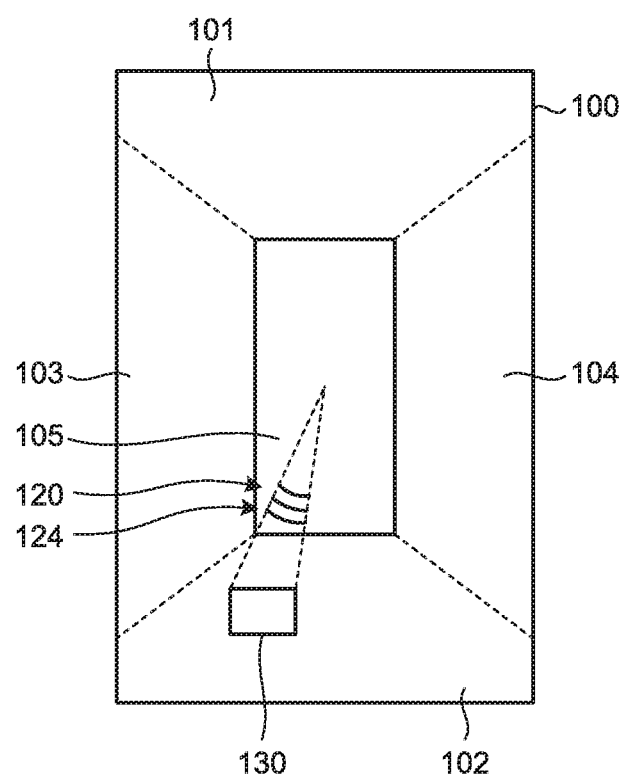
FIG. 14 is a diagram illustrating another example of the bird's-eye view video generated in the bird's-eye view video generation system according to the sixth embodiment.
Figure 15:
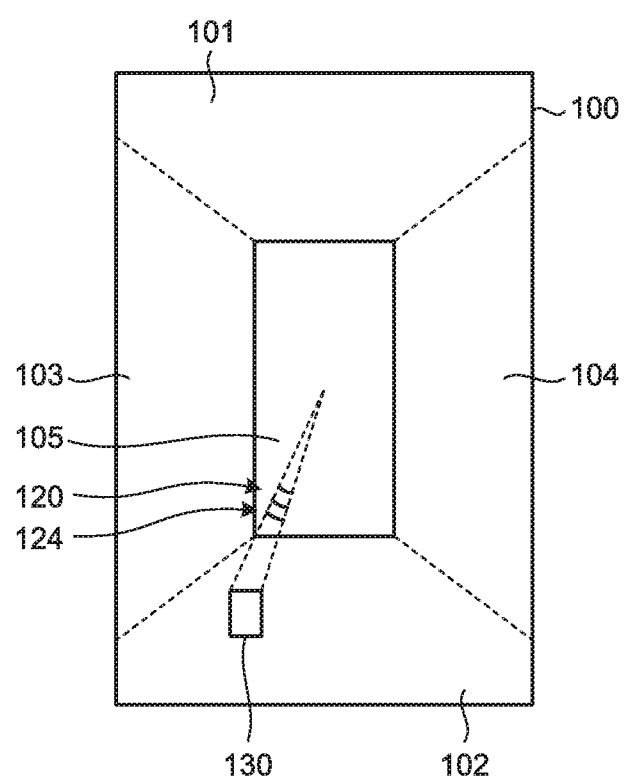
FIG. 15 is a diagram illustrating another example of the bird's-eye view video generated in the bird's-eye view video generation system according to the sixth embodiment.

Explained below with reference to FIGS. 13 to 15 is the bird's-eye view video generation system 1 according to a sixth embodiment. FIG. 13 is a diagram illustrating an example of the bird's-eye view video generated in the bird's-eye view video generation system according to the sixth embodiment. FIG. 14 is a diagram illustrating another example of the bird's-eye view video generated in the bird's-eye view video generation system according to the sixth embodiment. FIG. 15 is a diagram illustrating another example of the bird's-eye view video generated in the bird's-eye view video generation system according to the sixth embodiment. In the bird's-eye view video generation system according to the sixth embodiment, the processes performed by the superimposed video generating unit 47 of the bird's-eye view video generation device 40 are different from the processes performed in the bird's-eye view video generation system 1 according to the first embodiment.

As illustrated in FIGS. 13 to 15, a horizontal width of the obstacle notification icon 120 indicates a horizontal detection range of the sensor that detected the obstacle as well as a horizontal width of the detected obstacle. In the sixth embodiment, wider the horizontal detection range of the sensor that detected the obstacle is, the greater the length of the circular arcs of the obstacle notification icon 120 becomes. On the other hand, narrower the horizontal detection range of the sensor that detected the obstacle is, the smaller the length of the circular arcs of the obstacle notification icon 120 becomes. Thus, in the sixth embodiment, wider the horizontal width of the obstacle is, the greater the length of the circular arcs of the obstacle notification icon 120 becomes. On the other hand, narrower the horizontal width of the obstacle is, the smaller the length of the circular arcs of the obstacle notification icon 120 becomes.

More specifically, for example, a projection width from the center of the bird's-eye view video 100 to both ends of the obstacle in the horizontal direction can be set as the length of the circular arcs of the obstacle notification icon 120.

Based on the obstacle information obtained by the obstacle information obtaining unit 43, the superimposed video generating unit 47 generates the bird's-eye view video 100 in which the obstacle information with a width corresponding to the horizontal width of the detected obstacle is superimposed on the center video 105.

Explained below with reference to FIGS. 13 to 15 are examples in which an obstacle is detected in the rear left-side during the backward movement of the vehicle.

For example, explained below with reference to FIG. 13 is an example in which an obstacle is detected in the rear left-side during the backward movement of the vehicle and in which the distance to the obstacle is equal to 2 meters. At Step S14, the controller 41 makes the superimposed video generating unit 47 generate the bird's-eye view video 100 in which the obstacle notification icon 120, which has the horizontal width indicating the horizontal detection range of the sensor that detected the obstacle and which indicates the horizontal width of the detected obstacle, is superimposed on the center video 105. Herein, the horizontal width of the obstacle implies an apparent width detected by the sensor, that is, implies the projection width. The controller 41 makes the superimposed video generating unit 47 display the generated bird's-eye view video 100, which is illustrated in FIG. 13, in the display panel 31. By referring to the horizontal width of the obstacle notification icon 120, the horizontal detection range of the sensor that detected the obstacle can be known and it can be understood that the detected obstacle has a narrow horizontal width.

Explained below with reference to FIG. 14 is an example in which the distance to the obstacle shortens to 1 meter from the state illustrated in FIG. 13. At Step S14, the controller 41 makes the superimposed video generating unit 47 generate the bird's-eye view video 100 in which the obstacle notification icon 120 is superimposed on the center video 105. Since there is widening of the projection width from the center of the bird's-eye view video 100 to both ends in the horizontal direction of the obstacle, the obstacle notification icon 120 has a greater horizontal width as compared to the horizontal width of the obstacle notification icon 120 illustrated in FIG. 13. The controller 41 makes the superimposed video generating unit 47 display the generated bird's-eye view video 100, which is illustrated in FIG. 14, in the display panel 31. As a result of an increase in the horizontal width of the obstacle notification icon 120 as compared to the horizontal width illustrated in FIG. 13, it can be understood that the horizontal detection range of the sensor that detected the obstacle has increased and that the horizontal width of the detected obstacle has increased. That is, it can be understood that the obstacle has come closer to the rear end of the vehicle.

In this way, the superimposed video generating unit 47 varies the horizontal width of the obstacle notification icon 120 from the width illustrated in FIG. 13 to the width illustrated in FIG. 14 according to proximity of the obstacle. Thus, according to the variation in the horizontal width of the obstacle notification icon 120, it becomes possible to know whether the obstacle has come closer to the vehicle or has moved away from the vehicle.

Explained below with reference to FIG. 15 is an example in which an obstacle having a narrower horizontal width than the obstacle illustrated in FIG. 14 is detected in the rear left-side during the backward movement of the vehicle. At Step S14, the controller 41 makes the superimposed video generating unit 47 generate the bird's-eye view video 100 in which the obstacle notification icon 120 is superimposed on the center video 105. Herein, the obstacle notification icon 120 has a narrower horizontal width as compared to the obstacle notification icon 120 illustrated in FIG. 14. The controller 41 makes the superimposed video generating unit 47 display the generated bird's-eye view video 100, which is illustrated in FIG. 15, in the display panel 31. As a result of a decrease in the horizontal width of the obstacle notification icon 120 as compared to the horizontal width illustrated in FIG. 14, it can be understood that the horizontal detection range of the sensor that detected the obstacle has decreased and that the horizontal width of the detected obstacle has decreased. That is, it can be understood that the obstacle has a narrow horizontal width.

As described above, in the sixth embodiment, when an obstacle is detected around the vehicle, the bird's-eye view video 100 is generated in which the obstacle notification icon 120 is superimposed on the center video 105 so as to indicate the direction of the detected obstacle and indicate the horizontal width of the obstacle using the horizontal width of the circular arcs, and then the bird's-eye view video 100 is displayed in the display panel 31. In the sixth embodiment, the obstacle notification icon 120 can be used to display the direction of the obstacle and the horizontal width of the obstacle. In this way, in the sixth embodiment, it becomes possible to properly confirm the obstacles present around the vehicle.

Moreover, in the sixth embodiment, as the distance to the obstacle changes, the obstacle notification icon 120 is displayed by varying its horizontal width, for example, from the width illustrated in FIG. 13 to the width illustrated in FIG. 14. As a result, according to the sixth embodiment, the proximity of the obstacle can be made confirmable according to the variation in the horizontal width of the obstacle notification icon 120.

[Seventh Embodiment]

Figure 16:
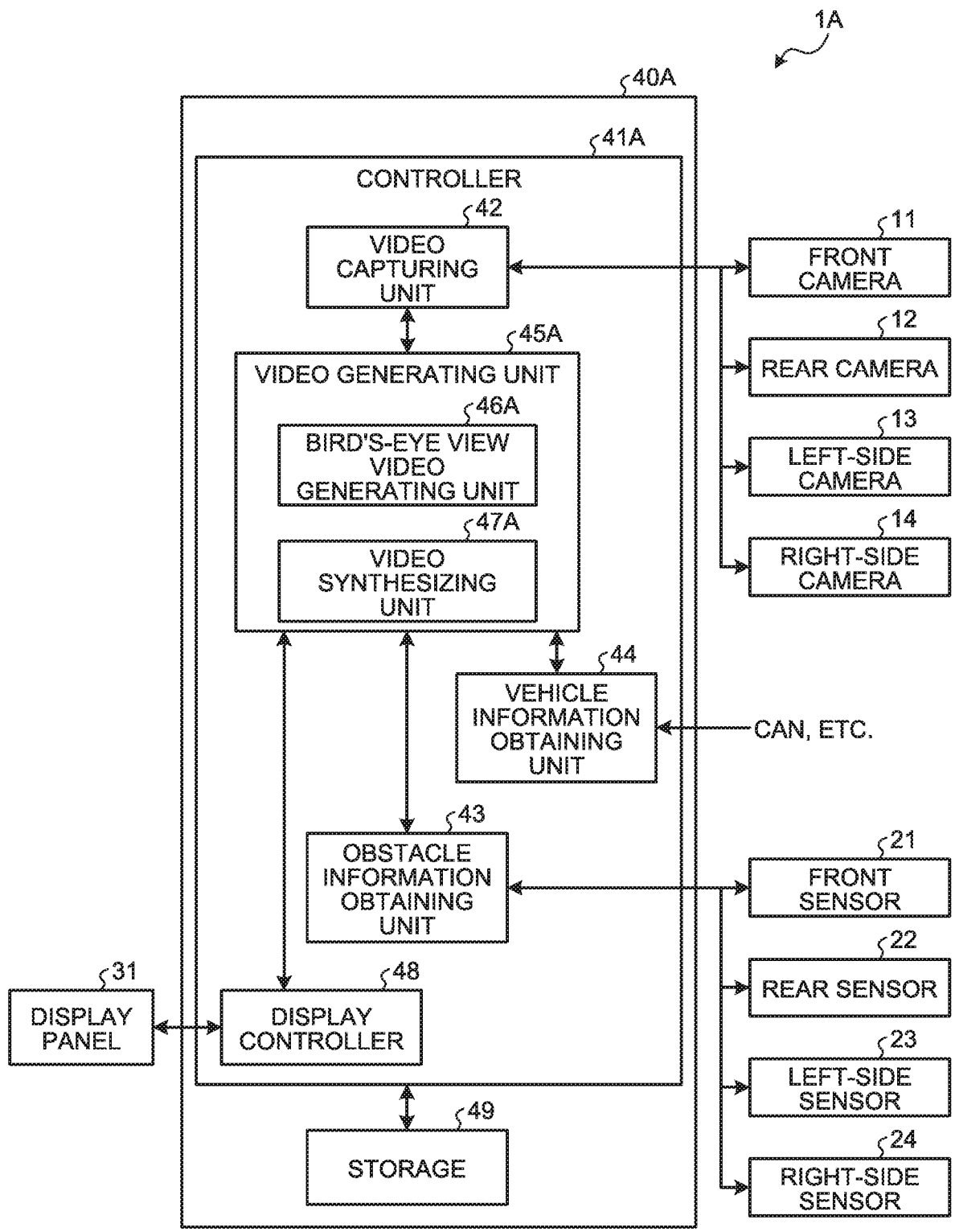
FIG. 16 is a block diagram illustrating an exemplary configuration of the bird's-eye view video generation system according to a seventh embodiment.

Explained below with reference to FIG. 16 is an bird's-eye view video generation system 1A according to a seventh embodiment. FIG. 16 is a block diagram illustrating an exemplary configuration of the bird's-eye view video generation system according to the seventh embodiment. The bird's-eye view video generation system 1A has an identical fundamental configuration to the bird's-eye view video generation system 1 according to the first embodiment.

An explanation about the bird's-eye view video generation system 1A is given with reference to FIG. 16. The bird's-eye view video generation system 1A includes the front camera 11, the rear camera 12, the left-side camera 13, the right-side camera 14, an front sensor (obstacle detecting unit) 21, a rear sensor (obstacle detecting unit) 22, a left-side sensor (obstacle detecting unit) 23, a right-side sensor (obstacle detecting unit) 24, the display panel 31, and an bird's-eye view video generation device 40A.

The front sensor 21 is installed in the front side of the vehicle for detecting the obstacles present in the front side of the vehicle. For example, the front sensor 21 can be an infrared sensor or an ultrasonic sensor. The front sensor 21 detects the obstacles that may make accidental contact with the vehicle and that have a height from the ground. For example, the front sensor 21 detects the obstacles within a distance of about 5 meters from the vehicle. In the vertical view, the front sensor 21 detects the obstacles present in, for example, the range of about 30° centering around its center. The detection range of the front sensor 21 may partially overlap with detection ranges of the left-side sensor 23 and the right-side sensor 24. Meanwhile, the front sensor 21 can be configured using a plurality of sensors. The front sensor 21 outputs obstacle information of each detected obstacle to the obstacle information obtaining unit 43 of the bird's-eye view video generation device 40A.

The rear sensor 22 is installed in the rear side of the vehicle for detecting the obstacles present in the rear side of the vehicle. For example, the rear sensor 22 can be an infrared sensor or an ultrasonic sensor. The rear sensor 22 detects the obstacles that may make accidental contact with the vehicle and that have a height from the ground. For example, the rear sensor 22 detects the obstacles within a distance of about 5 meters from the vehicle. In the vertical view, the rear sensor 22 detects the obstacles present in, for example, the range of about 30° centering around its center. The detection range of the rear sensor 22 may partially overlap with the detection ranges of the left-side sensor 23 and the right-side sensor 24. Meanwhile, the rear sensor 22 can be configured using a plurality of sensors. The rear sensor 22 outputs the obstacle information of each detected obstacle to the obstacle information obtaining unit 43 of the bird's-eye view video generation device 40A.

The left-side sensor 23 is installed in the left-side of vehicle for detecting the obstacles present in the left-side of the vehicle. For example, the left-side sensor 23 can be an infrared sensor or an ultrasonic sensor. The left-side sensor 23 detects the obstacles that may make accidental contact with the vehicle and that have a height from the ground. For example, the left-side sensor 23 detects the obstacles within a distance of about 5 meters from the vehicle. In the vertical view, the left-side sensor 23 detects the obstacles present in, for example, the range of about 30° centering around its center. The detection range of the left-side sensor 23 may partially overlap with the detection ranges of the front sensor 21 and the rear sensor 22. Meanwhile, the left-side sensor 23 can be configured using a plurality of sensors. The left-side sensor 23 outputs the obstacle information of each detected obstacle to the obstacle information obtaining unit 43 of the bird's-eye view video generation device 40A.

The right-side sensor 24 is installed in the right-side of the vehicle for detecting the obstacles present in the right-side of the vehicle. For example, the right-side sensor 24 can be an infrared sensor or an ultrasonic sensor. The right-side sensor 24 detects the obstacles that may make accidental contact with the vehicle and that have a height from the ground. For example, the right-side sensor 24 detects the obstacles within a distance of about 5 meters from the vehicle. In the vertical view, the right-side sensor 24 detects the obstacles present in, for example, the range of about 30° centering around its center. The detection range of the right-side sensor 24 may partially overlap with the detection ranges of the front sensor 21 and the rear sensor 22. Meanwhile, the right-side sensor 24 can be configured using a plurality of sensors. The right-side sensor 24 outputs the obstacle information of each detected obstacle to the obstacle information obtaining unit 43 of the bird's-eye view video generation device 40A.

Figure 17:
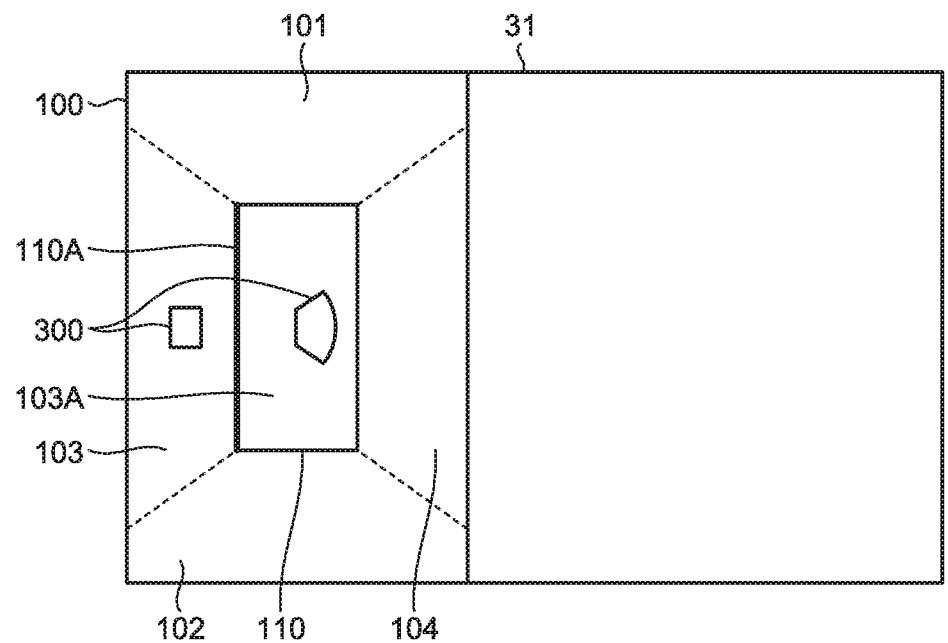
FIG. 17 is a diagram illustrating a display panel in which a bird's-eye view video generated in the bird's-eye view video generation system according to the seventh embodiment is displayed.
Figure 18:
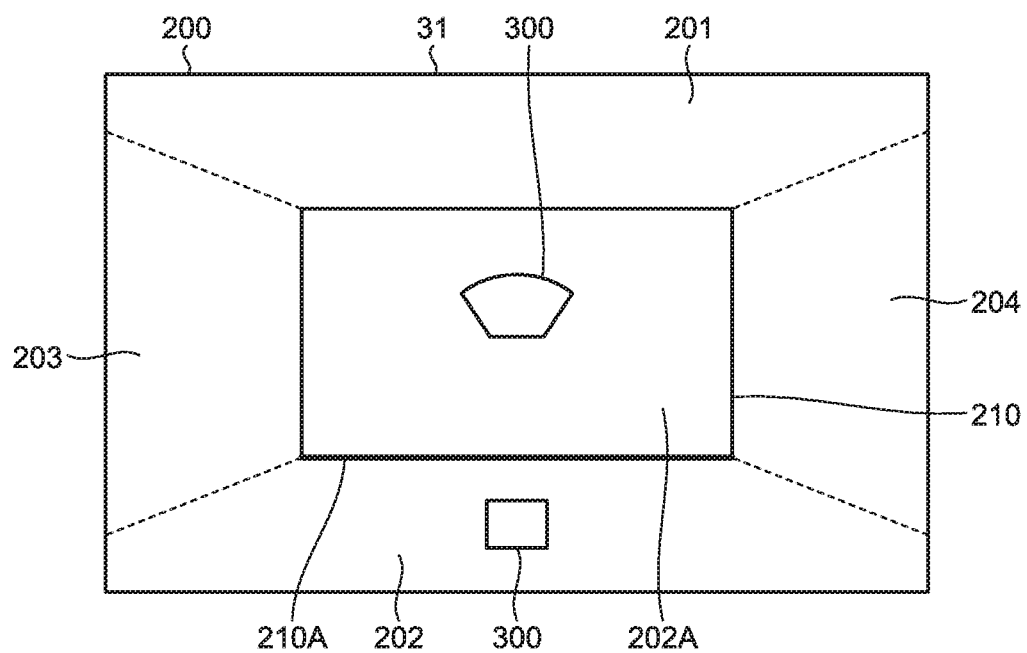
FIG. 18 is a diagram illustrating the display panel in which the bird's-eye view video in a horizontally long shape generated in the bird's-eye view video generation system according to the seventh embodiment is displayed.

The display panel 31 has a horizontally long rectangular shape. In the display panel 31, either the bird's-eye view video 100 that has a vertically long shape as illustrated in FIG. 17 is displayed, or a bird's-eye view video 200 that has a horizontally shape as illustrated in FIG. 18 is displayed. The bird's-eye view video 200 in the horizontally long shape is an bird's-eye view video having a horizontally long rectangular shape according to an aspect ratio of the display screen of the display panel 31.

A controller 41A includes the video capturing unit 42, the obstacle information obtaining unit 43, the vehicle information obtaining unit 44, a video generating unit 45A, and the display controller 48.

The obstacle information obtaining unit 43 obtains the obstacle information output by the front sensor 21, the rear sensor 22, the left-side sensor 23, and the right-side sensor 24.

The video generating unit 45A generates the bird's-eye view videos 100 and 200. The video generating unit 45A includes a bird's-eye view video generating unit 46A and a video synthesizing unit 47A.

The bird's-eye view video generating unit 46A generates the bird's-eye view video 100 by performing a viewpoint conversion with respect to the surrounding videos obtained by the video capturing unit 42 so that the vehicle is viewed in the bird's-eye view. More specifically, based on the surrounding videos acquired by the front camera 11, the rear camera 12, the left-side camera 13, and the right-side camera 14, the bird's-eye view video generating unit 46A generates the bird's-eye view video 100. As far as the method for generating the bird's-eye view video 100 is concerned, any known method can be implemented without restriction. Then, the bird's-eye view video generating unit 46A outputs the generated bird's-eye view video 100 to the display controller 48.

Explained below with reference to FIG. 17 is the bird's-eye view video 100. FIG. 17 is a diagram illustrating the display panel in which a bird's-eye view video generated in the bird's-eye view video generation system according to the seventh embodiment is displayed. The bird's-eye view video 100 has the vertically long rectangular shape. Moreover, the bird's-eye view video 100 includes the front video 101, the rear video 102, the left-side video 103, and the right-side video 104. The range enclosed by the front video 101, the rear video 102, the left-side video 103, and the right-side video 104 is called the center portion of the bird's-eye view video 100. In the bird's-eye view video 100, the center portion thereof represents a position of the vehicle. The front video 101, the rear video 102, the left-side video 103, the right-side video 104, and the center portion of the bird's-eye view video 100 can be partitioned by frame-like boundary lines 110.

In FIG. 17, the dashed lines indicating the boundaries of the front video 101, the rear video 102, the left-side video 103, and the right-side video 104 are illustrated only for the purpose of illustration. In reality, in the bird's-eye view video 100 displayed in the display panel 31, the dashed lines may or may not be displayed. The same is the case in the other drawings too.

When the front side or the rear side of the vehicle represents the direction of the detected obstacle based on the obstacle information obtained by the obstacle information obtaining unit 43, then the bird's-eye view video generating unit 46A generates the horizontally long bird's-eye view video 200 without varying the display orientation of the generated bird's-eye view video 100.

Herein, not varying the display orientation implies a state in which the longitudinal direction of the vehicle is maintained to correspond to the vertical direction of the bird's-eye view video 100 and the vertical direction of the bird's-eye view video 200. In other words, not varying the display orientation implies that, in the horizontally long bird's-eye view video 200, the following state is maintained: an front video 201 is placed in the upper side, a rear video 202 is placed in the lower side, a left-side video 203 is placed in the left-side, and a right-side video 204 is placed in the right-side. As a result of not varying the display orientation, the vertical direction of the bird's-eye view video 200 coincides with the longitudinal direction of the vehicle. Hence, the recognizability of the horizontally long bird's-eye view video 200 can be retained.

Explained below with reference to FIG. 18 is the bird's-eye view video 200. FIG. 18 is a diagram illustrating the display panel in which a horizontally long bird's-eye view video generated in the bird's-eye view video generation system according to the seventh embodiment is displayed. The bird's-eye view video 200 includes the front video 201, the rear video 202, the left-side video 203, and the right-side video 204. Moreover, the range enclosed between the front video 201, the rear video 202, the left-side video 203, and the right-side video 204 is called the center portion of the bird's-eye view video 200. In the bird's-eye view video 200, the center portion thereof represents the position of the vehicle. The front video 201, the rear video 202, the left-side video 203, the right-side video 204, and the center portion of the bird's-eye view video 200 can be partitioned by frame-like boundary lines 210.

Figure 19:
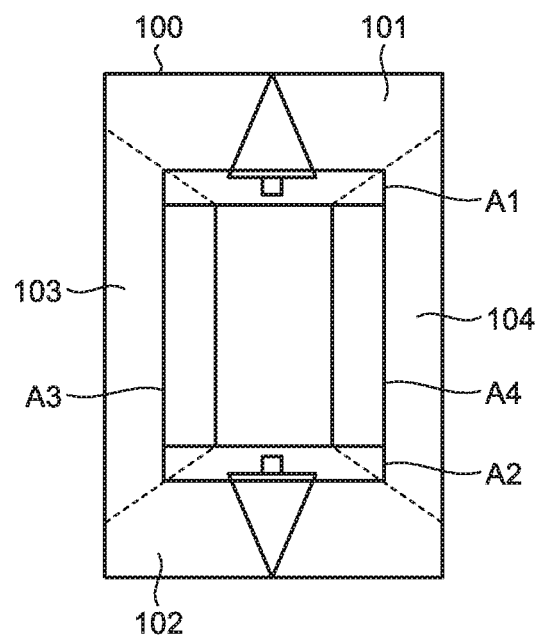
FIG. 19 is a diagram for explaining a method for generating the bird's-eye view video in the horizontally long shape in the bird's-eye view video generation system according to the seventh embodiment.
Figure 20:
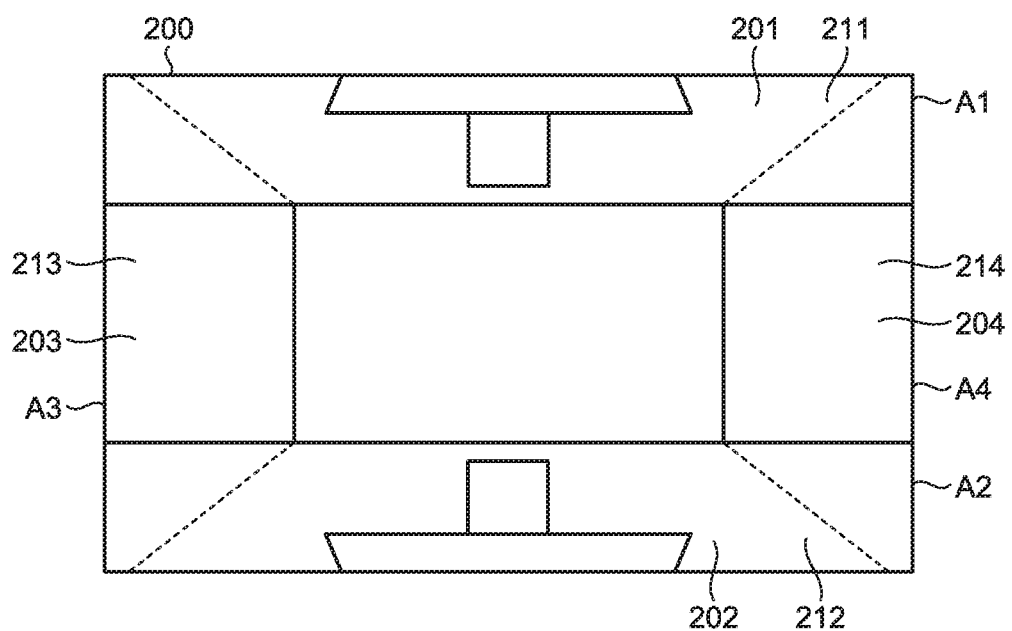
FIG. 20 is a diagram illustrating an example of the bird's-eye view video in the horizontally long shape generated from the bird's-eye view video illustrated in FIG. 19.

Explained below with reference to FIGS. 19 and 20 is a method by which the bird's-eye view video generating unit 46A generates a horizontally long bird's-eye view video 200. FIG. 19 is a diagram for explaining a method for generating the horizontally long bird's-eye view video in the bird's-eye view video generation system according to the seventh embodiment. FIG. 20 is a diagram illustrating an example of the horizontally long bird's-eye view video generated from the bird's-eye view video illustrated in FIG. 19.

In FIG. 19, solid lines indicating clipped ranges A1, A2, A3, and A4 are illustrated only for the purpose of illustration. Actually, in the bird's-eye view video 100 displayed in the display panel 31, the solid lines are not displayed. The same is the case in the other drawings too.

In the seventh embodiment, the bird's-eye view video generating unit 46A expands some portion of the surrounding video obtained either from the front camera 11 or the rear camera 12 while keeping the aspect ratio fixed, and generates the horizontally long bird's-eye view video 200. More specifically, from the vertically long bird's-eye view video 100, the bird's-eye view video generating unit 46A expands some portion of the front video 101 and some portion of the rear video 102 while keeping the aspect ratio fixed, and generates the horizontally long bird's-eye view video 200.

The bird's-eye view video generating unit 46A generates the horizontally long bird's-eye view video 200 from the clipped ranges A1, A2, A3, and A4 of the bird's-eye view video 100. More specifically, the bird's-eye view video generating unit 46A performs expansion while keeping the aspect ratio of the clipped ranges A1 and A2 of the bird's-eye view video 100 fixed, and generates the bird's-eye view video 200 having the horizontally long shape according to the aspect ratio of the display screen of the display panel 31.

The clipped range A1 represents a rectangular range including the front range of the vehicle that needs to be confirmed by the driver. The clipped range A1 includes some portion of the front video 101, some portion of the left-side video 103, and some portion of the right-side video 104 of the bird's-eye view video 100. Moreover, the clipped range A1 includes the boundary between the front video 101 and the left-side video 103, and includes the boundary between the front video 101 and the right-side video 104. In the seventh embodiment, the clipped range A1 includes the front portion up to about few tens of centimeters from the front end of the vehicle. Moreover, in the seventh embodiment, the clipped range A1 includes the left-side up to about few tens of centimeters from the left-side end of the vehicle. Furthermore, in the seventh embodiment, the clipped range A1 includes the right-side up to about few tens of centimeters from the right-side end of the vehicle.

The clipped range A2 represents a rectangular range including the rear range of the vehicle that needs to be confirmed by the driver. The clipped range A2 includes some portion of the rear video 102, some portion of the left-side video 103, and some portion of the right-side video 104 of the bird's-eye view video 100. Moreover, the clipped range A2 includes the boundary between the rear video 102 and the left-side video 103, and includes the boundary between the rear video 102 and the right-side video 104. In the seventh embodiment, the clipped range A2 includes the rear portion up to about few tens of centimeters from the rear end of the vehicle. Moreover, in the seventh embodiment, the clipped range A2 includes the left-side up to about few tens of centimeters from the left-side end of the vehicle. Furthermore, in the seventh embodiment, the clipped range A2 includes the right-side up to about few tens of centimeters from the right-side end of the vehicle. In the seventh embodiment, the clipped range A2 has an identical shape and identical dimensions to the clipped range A1.

The clipped range A3 represents a rectangular range present between the clipped ranges A1 and A2 of the bird's-eye view video 100. In the seventh embodiment, the clipped range A3 includes the left-side up to about few tens of centimeters from the left-side end of the vehicle. The left-side end of the clipping range A3 is collinear with the left-side end of the clipping range A1 and the left-side end of the clipping range A2.

The clipped range A4 represents a rectangular range present between the clipped ranges A1 and A2 of the bird's-eye view video 100. In the seventh embodiment, the clipped range A4 includes the right-side up to about few tens of centimeters from the right-side end of the vehicle. The right-side end of the clipping range A4 is collinear with the right-side end of the clipping range A1 and the right-side end of the clipping range A2. In the seventh embodiment, the clipped range A4 has an identical shape and identical dimensions to the clipped range A3.

The horizontally long bird's-eye view video 200 that is generated from the bird's-eye view video 100 includes a video 211 of the clipped range A1, a video 212 of the clipped range A2, a video 213 of the clipped range A3, and a video 214 of the clipped range A4.

The video 211 represents a video in which the video of the clipped range A1 of the bird's-eye view video 100 is expanded to have the same horizontal width as the horizontal width of the display panel 31 while keeping the aspect ratio fixed. With reference to FIG. 20, the video of a tree displayed in the video 211 is obtained when the video of the tree displayed in the clipped range A1 of the bird's-eye view video 100 illustrated in FIG. 19 is expanded while keeping the aspect ratio fixed.

The video 212 represents a video in which the video of the clipped range A2 of the bird's-eye view video 100 is expanded to have the same horizontal width as the horizontal width of the display panel 31 while keeping the aspect ratio fixed. With reference to FIG. 20, the video of a tree displayed in the video 212 is obtained when the video of the tree displayed in the clipped range A2 of the bird's-eye view video 100 illustrated in FIG. 19 is expanded while keeping the aspect ratio fixed.

The video 213 is obtained when the video of the clipped range A3 of the bird's-eye view video 100 is varied in size and shape according to the display panel 31 so that the boundary between the videos 211 and 212 becomes smoothly continuous. For example, the video 213 can be obtained when the video of the clipped range A3 of the bird's-eye view video 100 is compressed in the vertical direction and expanded in the horizontal direction.

The video 214 is obtained when the video of the clipped range A4 of the bird's-eye view video 100 is varied in size and shape according to the display panel 31 so that the boundary between the videos 211 and 212 becomes smoothly continuous. For example, the video 214 can be obtained when the video of the clipped range A4 of the bird's-eye view video 100 is compressed in the vertical direction and expanded in the horizontal direction.

The bird's-eye view video 200 includes the front video 201, the rear video 202, the left-side video 203, and the right-side video 204. The front video 201 is a portion of the video 211. The rear video 202 is a portion of the video 212. The left-side video 203 includes the bottom left portion of the video 211, the top left portion of the video 212, and the video 213. The right-side video 204 includes the bottom right portion of the video 211, the top right portion of the video 212, and the video 214.

The video synthesizing unit 47A synthesizes, with the center of the bird's-eye view video 100 or the center of the bird's-eye view video 200 generated by the bird's-eye view video generating unit 46A, a surrounding video which corresponds to the direction of the detected obstacle obtained by the obstacle information obtaining unit 43 and which is obtained from the front camera 11, the rear camera 12, the left-side camera 13, or the right-side camera 14, and generates the synthesized bird's-eye view video 100 or the bird's-eye view video 200. Herein, the surrounding video obtained from the front camera 11, the rear camera 12, the left-side camera 13, or the right-side camera 14 is a video prior to being subjected to viewpoint conversion. Then, the video synthesizing unit 47A outputs the generated bird's-eye view video 100 or the generated bird's-eye view video 200 to the display controller 48.

In the seventh embodiment, if the left-side or the right-side of the vehicle represents the direction of the detected obstacle obtained by the obstacle information obtaining unit 43, then the video synthesizing unit 47A generates the bird's-eye view video 100 by synthesizing the vertically long surrounding video obtained from the left-side camera 13 or the right-side camera 14 corresponding to the detection of the detected direction. The surrounding video that is synthesized in the center of the bird's-eye view video 100 is not subjected to the viewpoint conversion. Meanwhile, the video synthesizing unit 47A can display the boundary line 110 of the bird's-eye view video 100 in the direction of the detected obstacle as a heavy line or in a different color.

For example, if the left-side represents the direction of the detected obstacle, then the video synthesizing unit 47A synthesizes a vertically long surrounding video 103A, which is obtained from the left-side camera 13, with the center of the bird's-eye view video 100 as illustrated in FIG. 17. Moreover, in the left-side video 103 and the surrounding video 103A of the bird's-eye view video 100, video 300 of the obstacle in the rear side are included. A left-side boundary line 110A of the bird's-eye view video 100 is illustrated as a heavy line.

In the seventh embodiment, if the front side or the rear side of the vehicle represents the direction of the detected obstacle obtained by the obstacle information obtaining unit 43, then the video synthesizing unit 47A generates the horizontally long bird's-eye view video 200 in which a horizontally long surrounding video, which is obtained either from the front camera 11 or the rear camera 12 corresponding to the direction of the detected obstacle, is synthesized with the center. Herein, the surrounding video synthesized with the center of the bird's-eye view video 200 is not subjected to the viewpoint conversion. Meanwhile, the video synthesizing unit 47A can display the boundary lines 210 of the bird's-eye view video 200 in the direction of the detected obstacle as a heavy line or in a different color.

For example, if the rear side represents the direction of the detected obstacle, then the video synthesizing unit 47A synthesizes a horizontally long surrounding video 202A, which is obtained from the rear camera 12, with the center of the bird's-eye view video 200 as illustrated in FIG. 18. Moreover, in the rear video 202 and the surrounding video 202A of the bird's-eye view video 200, the obstacle videos 300 of the obstacle in the rear side are included. A lower-side boundary line 210A of the bird's-eye view video 200 is illustrated as a heavy line.

Figure 21:
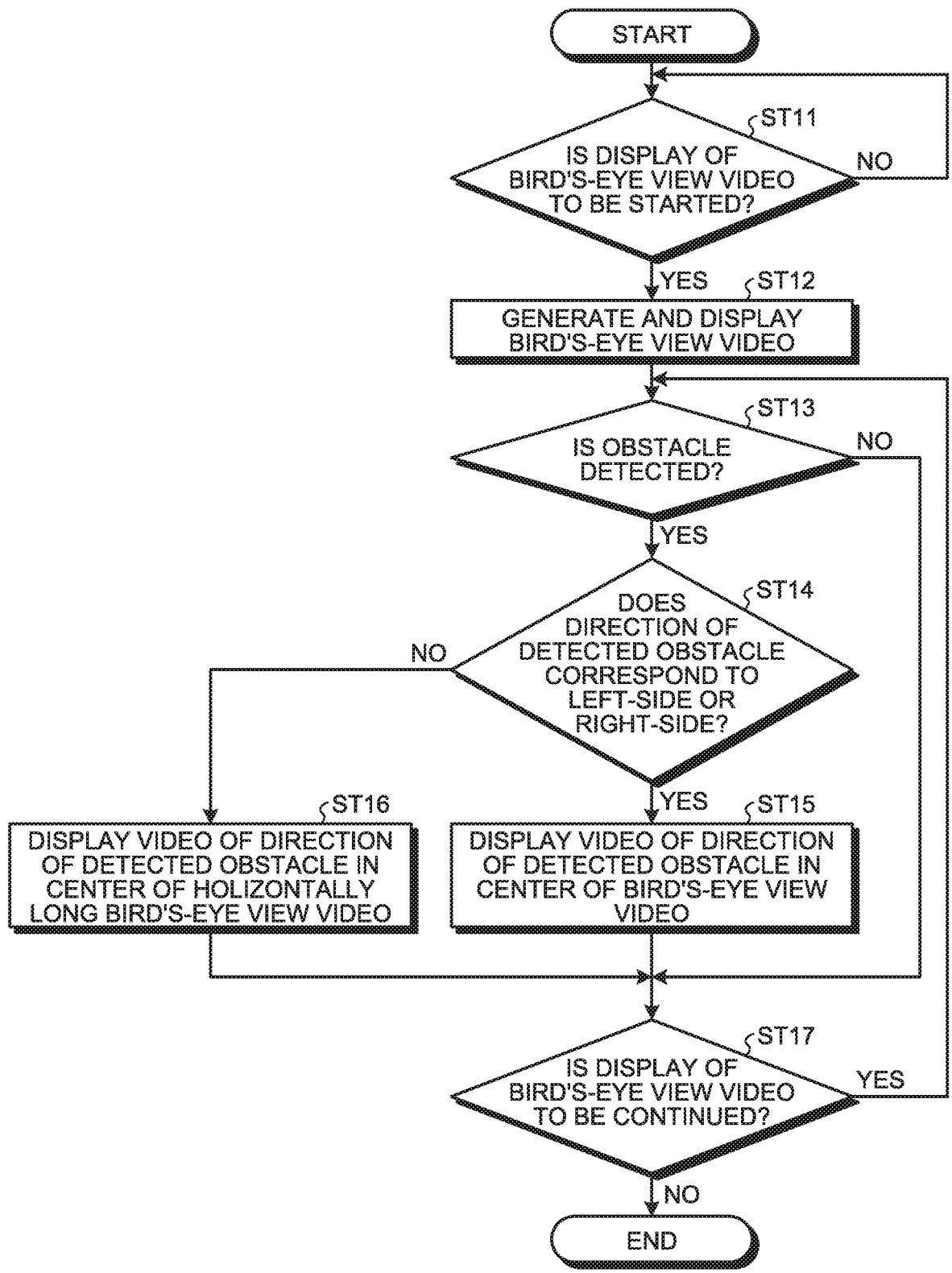
FIG. 21 is a flowchart for explaining a flow of operations performed in the bird's-eye view video generation device of the bird's-eye view video generation system according to the seventh embodiment.

Explained below with reference to FIG. 21 is a flow of processes performed in the bird's-eye view video generation device 40A of the bird's-eye view video generation system 1A. FIG. 21 is a flowchart for explaining a flow of processes performed in the bird's-eye view video generation device of the bird's-eye view video generation system according to the seventh embodiment.

The controller 41A determines whether or not to start the display of the bird's-eye view video (Step ST11). As an example of the determination to start the display of the bird's-eye view video, the controller 41A determines whether or not to start the display of the bird's-eye view video based on the presence or absence of a backward movement trigger. Herein, the backward movement trigger implies, for example, a case in which the gearshift lever is set to "reverse". Alternatively, the backward movement trigger implies a case in which the travelling direction of the vehicle corresponds to a direction toward the rear side of the vehicle. If there is no backward movement trigger, then the controller 41 determines not to start the display of the bird's-eye view video (No at Step ST11), and again performs the process at Step ST11. When there is the backward movement trigger, the controller 41A determines to start the display of the bird's-eye view video (Yes at Step ST11), and the system control proceeds to Step ST12.

The controller 41A generates to display the bird's-eye view video 100 (Step ST12). More specifically, the controller 41A makes the bird's-eye view video generating unit 46A generate the bird's-eye view video 100 by performing viewpoint conversion with respect to the surrounding videos obtained by the video capturing unit 42 so that the vehicle is viewed from above. Then, the controller 41A makes the display controller 48 display the generated bird's-eye view video 100 in the display panel 31.

The controller 41A determines whether or not an obstacle is detected (Step ST13). More specifically, the controller 41A determines whether or not the obstacle information obtaining unit 43 has obtained obstacle information. If it is determined that the obstacle information obtaining unit 43 has obtained the obstacle information (Yes at Step ST13), then the system control proceeds to Step ST14. If it is determined that the obstacle information obtaining unit 43 has not obtained the obstacle information (No at Step ST13), then the system control proceeds to Step ST17.

In the seventh embodiment, based on the obstacle information obtained by the obstacle information obtaining unit 43, the controller 41A determines whether or not an obstacle positioned in the travelling direction of the vehicle is detected. Herein, the position in the travelling direction of the vehicle implies a position in a direction in which the distance to the vehicle goes on decreasing in proportion to the frontward movement of the vehicle, and includes a range in which the obstacle interferes with the vehicle in proportion to the frontward movement of the vehicle. More particularly, when the vehicle is going straight ahead in its frontward movement, the controller 41A determines the presence or absence of the detection of the obstacle in a range centered around the travelling direction of the vehicle, and when the vehicle is going ahead while being steered, the controller 41A determines the presence or absence of the detection of the obstacle in the range including a range in which the obstacle interferes with the vehicle due to steering of the vehicle in the travelling direction of the vehicle.

The controller 41A determines the direction of the detected obstacle corresponds to the left-side or the right-side (Step ST14). In the seventh embodiment, based on the obstacle information obtained by the obstacle information obtaining unit 43, the controller 41A determines the direction of the closest detected obstacle to the vehicle corresponds to the left-side or the right-side. More specifically, the controller 41A determines the obstacle information of the closet obstacle to the vehicle corresponds to the obstacle information from the left-side sensor 23 or the right-side sensor 24.

If it is determined that the obstacle information of the closet obstacle to the vehicle corresponds to the obstacle information from the left-side sensor 23 or the right-side sensor 24 (Yes at Step ST14), the system control proceeds to Step ST15. However, if it is determined that the obstacle information of the closet obstacle to the vehicle does not correspond to the obstacle information from the left-side sensor 23 or the right-side sensor 24 (No at Step ST14), then the system control proceeds to Step ST16.

The controller 41A generates the bird's-eye view video 100 in which the surrounding video of the direction of the detected obstacle is displayed in the center (Step ST15). More specifically, the controller 41 makes the video synthesizing unit 47A generate the bird's-eye view video 100 by synthesizing, with the center of the bird's-eye view video 100 generated by the bird's-eye view video generating unit 46A, the vertically long surrounding video obtained from either the left-side camera 13 or the right-side camera 14 corresponding to the direction of the closest detected obstacle to the vehicle. Then, the controller 41A makes the display controller 48 display the generated bird's-eye view video 100 in the display panel 31.

The controller 41A generates the horizontally long bird's-eye view video 200 in which the surrounding video of the direction of the detected obstacle is displayed in the center (Step ST16). More specifically, the controller 41A makes the bird's-eye view video generating unit 46A generates the bird's-eye view video 200 by changing the shape of the bird's-eye view video 100, which is generated at Step ST12, into the horizontally long shape without any change in the display orientation. Then, the controller 41A makes the video synthesizing unit 47A generate the bird's-eye view video 200 by synthesizing, with the center of the horizontally long bird's-eye view video 200, the horizontally long surrounding video obtained from either the front camera 11 or the rear camera 12 corresponding to the direction of the detected closest obstacle to the vehicle. Then, the controller 41A makes the display controller 48 display the generated horizontally long bird's-eye view video 200 in the display panel 31.

The controller 41A determines whether or not to continue the display of the bird's-eye view video (Step ST17). More specifically, the controller 41A determines whether or not to continue the display of the bird's-eye view video based on the presence or absence of the backward movement trigger. When there is the backward movement trigger, the controller 41A determines to continue the display of the bird's-eye view video (Yes at Step ST17), and the system control returns to Step ST13. However, if there is no backward movement trigger, in other words, if the backward movement trigger has been released, then the controller 41A determines not to continue the display of the bird's-eye view video (No at Step ST17), and ends the processes.

In this way, in the bird's-eye view video generation system 1A, when the obstacle is detected in the left-side or the right-side of the vehicle, the bird's-eye view video 100 is generated in which the vertically long surrounding video obtained from either the left-side camera 13 or the right-side camera 14 corresponding to the direction of the detected obstacle is synthesized with the center.

In the bird's-eye view video generation system 1A, when the obstacle is detected in the front side or the rear side of the vehicle, the horizontally long bird's-eye view video 200 is generated in which the horizontally long surrounding video obtained from either the front camera 11 or the rear camera 12 corresponding to the direction of the detected obstacle is synthesized with the center.

As described above, in the seventh embodiment, the bird's-eye view video 100 and the bird's-eye view video 200 are generated in which the surrounding video corresponding to the direction of the detected obstacle is synthesized in the center. As a result, in the seventh embodiment, not only the bird's-eye view video 100 or the bird's-eye view video 200 can be confirmed but also the surrounding video of the direction of the detected obstacle can be confirmed without any substantial movement in the line of sight of the driver. In this way, in the seventh embodiment, it becomes possible to properly confirm the obstacles present around the vehicle while suppressing the movement of the line of sight of the driver.

In the seventh embodiment, when the obstacle is detected in the left-side or the right-side of the vehicle, the bird's-eye view video 100 is generated in which the vertically long surrounding video obtained from either the left-side camera 13 or the right-side camera 14 corresponding to the direction of the detected obstacle is synthesized with the center. In the seventh embodiment, when the obstacle is detected in the front side or the rear side of the vehicle, the horizontally long bird's-eye view video 200 is generated in which the surrounding video obtained either from the front camera 11 or the rear camera 12 corresponding to the direction of the detected obstacle is synthesized with the center. In this way, in the seventh embodiment, a state in which longitudinal direction of the vehicle is maintained to correspond to the vertical direction of the bird's-eye view video 100 and the vertical direction of the bird's-eye view video 200 regardless of the direction of the detected obstacle. Hence, according to the seventh embodiment, the driver can easily confirm the surrounding of the vehicle when confirming the bird's-eye view video 100 or the bird's-eye view video 200.

In the seventh embodiment, when the obstacle is detected in the front side or the rear side of the vehicle, the horizontally long bird's-eye view video 200 is generated in which the surrounding video corresponding to the direction of the detected obstacle is synthesized with the center, and then the bird's-eye view video 200 is displayed in the display panel 31. In the seventh embodiment, the horizontally long bird's-eye view video 200 can be displayed over the entire display screen of the display panel 31. Hence, in the seventh embodiment, when the obstacle is detected in the front side or the rear side of the vehicle, the surrounding video can be widely displayed in the center of the bird's-eye view video 200.

In the seventh embodiment, the video 211 of the bird's-eye view video 200 has the same aspect ratio as the video of the clipped area A1 of the bird's-eye view video 100. In other words, the front video 201 of the bird's-eye view video 200 has the same aspect ratio as the video of the clipped range A1 of the bird's-eye view video 100. The video 212 of the bird's-eye view video 200 has the same aspect ratio as the video of the clipped range A2 of the bird's-eye view video 100. In other words, the rear video 202 of the bird's-eye view video 200 has the same aspect ratio as the video of the clipped range A2 of the bird's-eye view video 100. In this way, in the seventh embodiment, the front video 201 and the rear video 202 in the bird's-eye view video 200 have unchanged aspect ratios and are not deformed. Hence, according to the seventh embodiment, the front video 201 and the rear video 202 in the bird's-eye view video 200 can be confirmed without any sense of discomfort.

[Eighth Embodiment]

Figure 22:
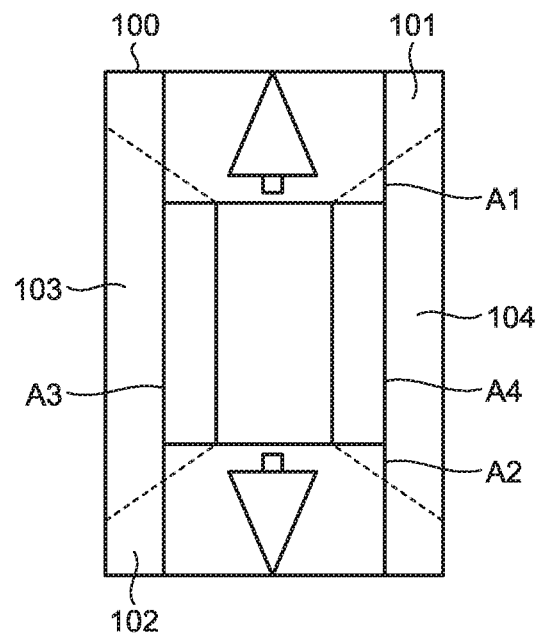
FIG. 22 is a diagram for explaining a method for generating the bird's-eye view video in the horizontally long shape in the bird's-eye view video generation system according to an eighth embodiment.
Figure 23:
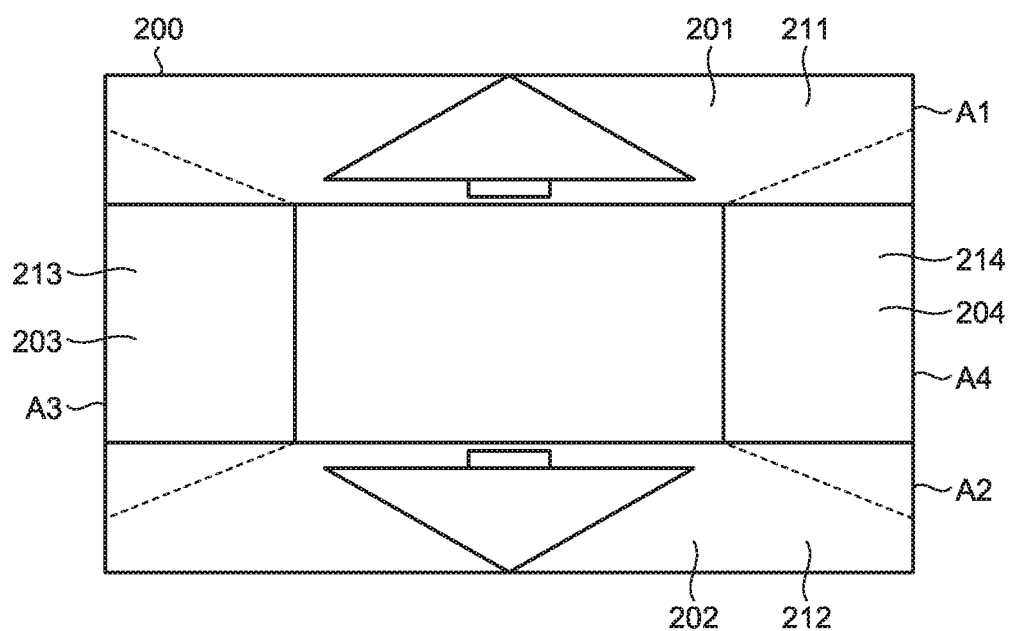
FIG. 23 is a diagram illustrating an example of the bird's-eye view video in the horizontally long shape generated from the bird's-eye view video illustrated in FIG. 22.

Explained below with reference to FIGS. 22 and 23 is the bird's-eye view video generation system 1A according to an eighth embodiment. FIG. 22 is a diagram for explaining a method for generating a horizontally long bird's-eye view video in the bird's-eye view video generation system according to the eighth embodiment. FIG. 23 is a diagram illustrating an example of the horizontally long bird's-eye view video generated from the bird's-eye view video illustrated in FIG. 22. The bird's-eye view video generation system 1A has an identical fundamental configuration to the bird's-eye view video generation system 1A according to the seventh embodiment. In the bird's-eye view video generation system 1A according to the eighth embodiment, the method by which the bird's-eye view video generating unit 46A generates the bird's-eye view video 200 is different from the method implemented in the bird's-eye view video generation system 1A according to the seventh embodiment.

Based on the obstacle information obtained by the obstacle information obtaining unit 43, when the direction of the detected obstacle corresponds to the front side or the rear side of the vehicle, then the bird's-eye view video generating unit 46A compresses, in the vertical direction, the surrounding video obtained from either the front camera 11 or the rear camera 12 and generates the horizontally long bird's-eye view video 200. More specifically, the bird's-eye view video generating unit 46A compresses the front video 101 and the rear video 102 of the generated vertically long bird's-eye view video 100, and generates the horizontally long bird's-eye view video 200.

The clipped range A1 illustrated in FIG. 22 has the same vertical width as the vertical width of the front video 101 of the bird's-eye view video 100. The clipped range A1 includes the boundary between the front video 101 and the left-side video 103, and includes the boundary between the front video 101 and the right-side video 104. The clipped range A1 includes the left-side up to about few tens of centimeters from the left-side end of the vehicle. Moreover, the clipped range A1 includes the right-side up to about few tens of centimeters from the right-side end of the vehicle.

The clipped range A2 has the same vertical width as the vertical width of the rear video 102 of the bird's-eye view video 100. The clipped range A2 includes the boundary between the rear video 102 and the left-side video 103, and includes the boundary between the rear video 102 and the right-side video 104. The clipped range A2 includes the left-side up to about few tens of centimeters from the left-side end of the vehicle. Moreover, the clipped range A2 includes the right-side up to about few tens of centimeters from the right-side end of the vehicle. Meanwhile, the clipped range A2 has an identical shape and identical dimensions to the clipped range A1.

The clipped ranges A3 and A4 are identical to the seventh embodiment.

The bird's-eye view video generating unit 46A compresses the clipped ranges A1 and A2 of the bird's-eye view video 100 in the vertical direction, and generates the horizontally long bird's-eye view video 200 according to the aspect ratio of the display screen of the display panel 31.

The following explanation is given about the horizontally long bird's-eye view video 200 generated from the bird's-eye view video 100.

The video 211 is obtained by compressing the video of the clipped range A1 of the bird's-eye view video 100 in the vertical direction. In FIG. 23, the video of a tree displayed in the video 211 is obtained when the video of the tree displayed in the clipped range A1 of the bird's-eye view video 100 illustrated in FIG. 22 is compressed in the vertical direction. The video of the tree displayed in the video 211 includes the entire video of the tree displayed in the front video 101 of the bird's-eye view video 100.

The video 212 is obtained by compressing the video of the clipped range A2 of the bird's-eye view video 100 in the vertical direction. In FIG. 23, the video of a tree displayed in the video 212 is obtained when the video of the tree displayed in the clipped range A2 of the bird's-eye view video 100 illustrated in FIG. 22 is compressed in the vertical direction. The video of the tree displayed in the video 212 includes the entire video of the tree displayed in the rear video 102 of the bird's-eye view video 100.

The videos 213 and 214 are identical to the seventh embodiment.

As described above, according to the eighth embodiment, the video 211 of the bird's-eye view video 200 is obtained by compressing the video of the clipped range A1 of the bird's-eye view video 100. The video 211 of the bird's-eye view video 200 includes the entire portion in the vertical direction of the front video 101. Moreover, in the eighth embodiment, the video 212 of the bird's-eye view video 200 is obtained by compressing the video of the clipped range A2 of the bird's-eye view video 100. The video 212 of the bird's-eye view video 200 includes the entire portion in the vertical direction of the rear video 102. Hence, in the eighth embodiment, in the bird's-eye view video 200, the driver can confirm the same range as the range of the vertical direction of the front video 101 and the rear video 102 of the bird's-eye view video 100.

[Ninth Embodiment]

Figure 24:
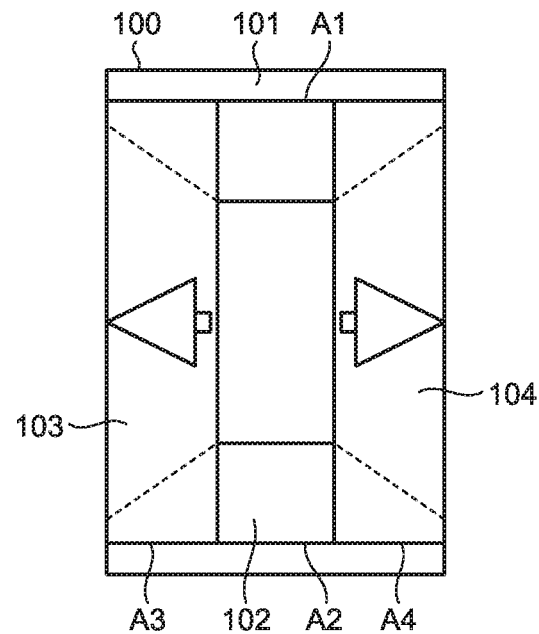
FIG. 24 is a diagram for explaining a method for generating the bird's-eye view video in the horizontally long shape in the bird's-eye view video generation system according to a ninth embodiment.
Figure 25:
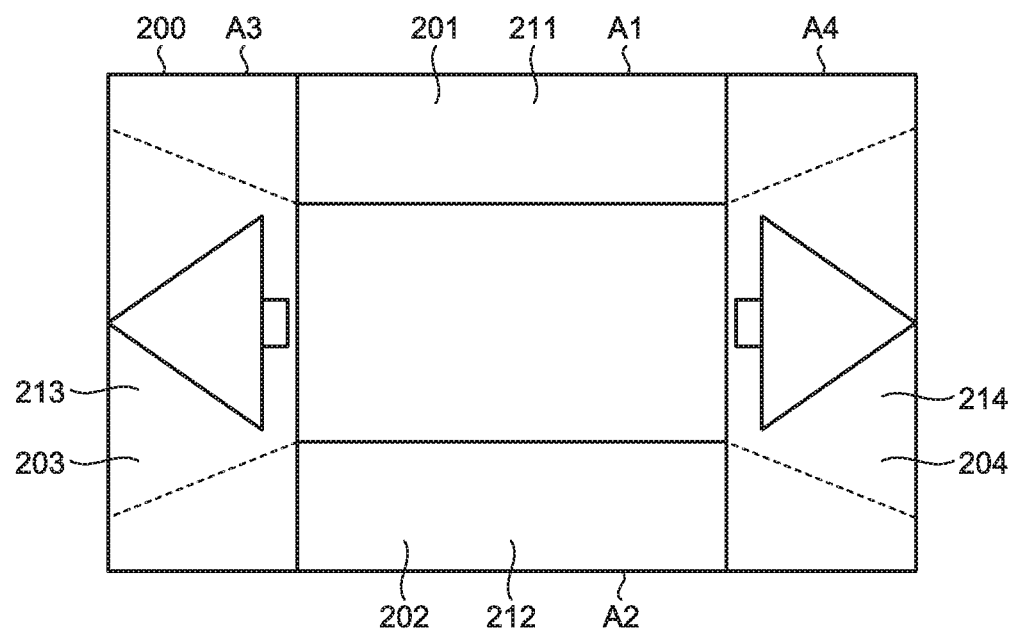
FIG. 25 is a diagram illustrating an example of the bird's-eye view video in the horizontally long shape generated from the bird's-eye view video illustrated in FIG. 24.

Explained below with reference to FIGS. 24 and 25 is the bird's-eye view video generation system 1A according to a ninth embodiment. FIG. 24 is a diagram for explaining a method for generating a horizontally long bird's-eye view video in the bird's-eye view video generation system according to the ninth embodiment. FIG. 25 is a diagram illustrating an example of a horizontally long bird's-eye view video generated from the bird's-eye view video illustrated in FIG. 24. In the bird's-eye view video generation system 1A according to the ninth embodiment, the method by which the bird's-eye view video generating unit 46A generates the bird's-eye view video 200 is different from the method implemented in the bird's-eye view video generation system 1A according to the seventh embodiment.

Based on the obstacle information obtained by the obstacle information obtaining unit 43, when the direction of the detected obstacle corresponds to the front side or the rear side of the vehicle, then the bird's-eye view video generating unit 46A compresses, in the vertical direction, the vertically long surrounding video obtained from either the left-side camera 13 or the right-side camera 14 and generates the horizontally long bird's-eye view video 200. More specifically, the bird's-eye view video generating unit 46A compresses the clipped ranges A3 and A4 of the generated bird's-eye view video 100 in the vertical direction and generates the bird's-eye view video 200.

The clipped range A3 illustrated in FIG. 24 has the same horizontal width as the horizontal width of the left-side video 103 of the bird's-eye view video 100. The clipped range A3 includes the boundary between the left-side video 103 and the front video 101, and includes the boundary between the left-side video 103 and the rear video 102. Moreover, the clipped range A3 includes the front portion up to about few meters from the front end of the vehicle. Furthermore, the clipped range A3 includes the rear portion up to about few meters from the rear end of the vehicle.

The clipped range A4 has the same horizontal width as the horizontal width of the right-side video 104 of the bird's-eye view video 100. The clipped range A4 includes the boundary between the right-side video 104 and the front video 101, and includes the boundary between the right-side video 104 and the rear video 102. Moreover, the clipped range A4 includes the front portion up to about few meters from the front end of the vehicle. Furthermore, the clipped range A4 includes the rear portion up to about few meters from the rear end of the vehicle. Meanwhile, the clipped range A4 has an identical shape and identical dimensions to the clipped range A3.

The clipped range A1 is a rectangular range positioned between the clipped ranges A3 and A4. The clipped range A1 includes the front portion up to about few meters from the front end of the vehicle. The front end of the clipped range A1 is collinear with the front end of the clipping range A3 and the front end of the clipping range A4.

The clipped range A2 is a rectangular range positioned between the clipped ranges A3 and A4. The clipped range A2 includes the rear portion up to about few meters from the rear end of the vehicle. The rear end of the clipped range A2 is collinear with the rear end of the clipping range A3 and the rear end of the clipping range A4.

The bird's-eye view video generating unit 46A compresses the clipped ranges A3 and A4 of the generated bird's-eye view video 100 in the vertical direction, and generates the horizontally long bird's-eye view video 200 according to the aspect ratio of the display screen of the display panel 31.

The following explanation is given about the horizontally long bird's-eye view video 200 generated from the bird's-eye view video 100.

The video 213 is obtained by compressing the clipped range A3 of the bird's-eye view video 100 in the vertical direction. With reference to FIG. 25, the video of a tree displayed in the video 213 is obtained when the video of the tree displayed in the clipped range A3 of the bird's-eye view video 100 is compressed in the vertical direction. The video of the tree displayed in the video 213 includes the entire video of the tree displayed in the left-side video 103 of the bird's-eye view video 100.

The video 214 is obtained by compressing the clipped range A4 of the bird's-eye view video 100 in the vertical direction. With reference to FIG. 25, the video of a tree displayed in the video 214 is obtained when the video of the tree displayed in the clipped range A4 of the bird's-eye view video 100 is compressed in the vertical direction. The video of the tree displayed in the video 214 includes the entire video of the tree displayed in the right-side video 104 of the bird's-eye view video 100.

The video 211 is obtained when the video of the clipped range A1 of the bird's-eye view video 100 is varied in size and shape according to the display panel 31 so that the boundary between the videos 213 and 214 becomes smoothly continuous. For example, the video 211 can be obtained when the video of the clipped range A1 of the bird's-eye view video 100 is expanded in the horizontal direction.

The video 212 is obtained when the video of the clipped range A2 of the bird's-eye view video 100 is varied in size and shape according to the display panel 31 so that the boundary between the videos 213 and 214 becomes smoothly continuous. For example, the video 212 can be obtained when the video of the clipped range A2 of the bird's-eye view video 100 is expanded in the horizontal direction.

As described above, according to the ninth embodiment, the video 213 of the bird's-eye view video 200 is obtained when the video of the clipped range A3 of the bird's-eye view video 100 is compressed in the vertical direction. The video 213 of the bird's-eye view video 200 includes the entire portion in the horizontal direction of the left-side video 103. Moreover, in the ninth embodiment, the video 214 of the bird's-eye view video 200 is obtained when the video of the clipped range A4 of the bird's-eye view video 100 is compressed in the vertical direction. The video 214 of the bird's-eye view video 200 includes the entire portion in the horizontal direction of the right-side video 104. Hence, according to the ninth embodiment, in the bird's-eye view video 200, the driver can confirm the same range as the range of the left-side video 103 and the right-side video 104 of the bird's-eye view video 100.

[10th Embodiment]

Figure 26:
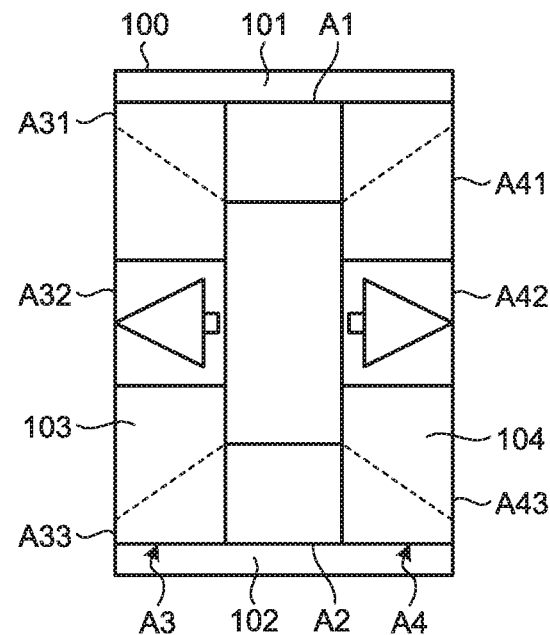
FIG. 26 is a diagram for explaining a method for generating the bird's-eye view video in the horizontally long shape in the bird's-eye view video generation system according to a 10th embodiment.
Figure 27:
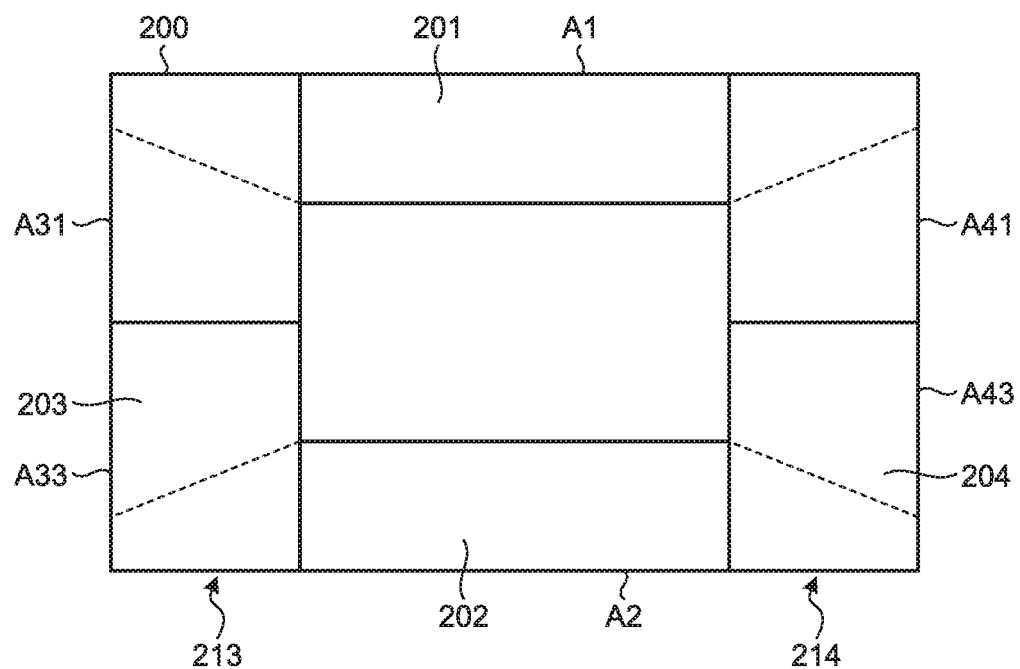
FIG. 27 is a diagram illustrating an example of the bird's-eye view video in the horizontally long shape generated from the bird's-eye view video illustrated in FIG. 26.

Explained below with reference to FIGS. 26 and 27 is the bird's-eye view video generation system 1A according to a 10th embodiment. FIG. 26 is a diagram for explaining a method for generating a horizontally long bird's-eye view video in the bird's-eye view video generation system according to the 10-th embodiment. FIG. 27 is a diagram illustrating an example of a horizontally long bird's-eye view video generated from the bird's-eye view video illustrated in FIG. 26. In the bird's-eye view video generation system 1A according to the 10th embodiment, the method by which the bird's-eye view video generating unit 46A generates the horizontally long bird's-eye view video 200 is different from the method implemented in the bird's-eye view video generation system 1A according to the ninth embodiment.

Based on the obstacle information obtained by the obstacle information obtaining unit 43, when the direction of the detected obstacle corresponds to the front side or the rear side of the vehicle, then the bird's-eye view video generating unit 46A synthesizes the upper portion and the lower portion, excluding the middle portion, of the vertically long surrounding video obtained from either the left-side camera 13 or the right-side camera 14, and generates the horizontally long bird's-eye view video 200.

The clipping range A3 illustrated in FIG. 26 includes an upper portion A31, a middle portion A32, and a lower portion A33. The upper portion A31 includes the boundary between the left-side video 103 and the front video 101. The lower portion A33 includes the boundary between the left-side video 103 and the rear video 102.

The clipped range A4 includes an upper portion A41, a middle portion A42, and a lower portion A43. The upper portion A41 includes the boundary between the right-side video 104 and the front video 101. The lower portion A43 includes the boundary between the right-side video 104 and the rear video 102. The clipped range A4 has an identical shape and identical dimensions to the clipped range A3.

The clipped ranges A1 and A2 are identical to the ninth embodiment.

The bird's-eye view video generating unit 46A synthesizes the upper portion A31 and the lower portion A33 of the clipped range A3 and synthesizes the upper portion A41 and the lower portion A43 of the clipped range A4 of the generated bird's-eye view video 100, and generates the horizontally long bird's-eye view video 200 according to the aspect ratio of the display screen of the display panel 31.

The following explanation is given about the horizontally long bird's-eye view video 200 generated from the bird's-eye view video 100.

The video 213 is obtained as a result of synthesizing the upper portion A31 and the lower portion A33, excluding the middle portion A32, of the clipped range A3 of the bird's-eye view video 100. With reference to FIG. 27, the video 213 does not include the video of the tree displayed in the middle portion A32 of the clipped range A3 of the bird's-eye view video 100 illustrated in FIG. 26. Meanwhile, in the video 213, in order to illustrate that the middle portion A32 of the clipped range A3 of the bird's-eye view video 100 is omitted, a line can be displayed at the boundary between the upper portion A31 and the lower portion A33.

The video 214 is obtained as a result of synthesizing the upper portion A41 and the lower portion A43, excluding the middle portion A42, of the clipped range A4 of the bird's-eye view video 100. With reference to FIG. 27, the video 214 does not include the video of the tree displayed in the middle portion A42 of the clipped range A4 of the bird's-eye view video 100 illustrated in FIG. 26. Meanwhile, in the video 214, in order to illustrate that the middle portion A42 of the clipped range A4 of the bird's-eye view video 100 is omitted, a line can be displayed at the boundary between the upper portion A41 and the lower portion A43.

The videos 211 and 212 are identical to the ninth embodiment.

As described above, according to the 10th embodiment, the video 213 of the bird's-eye view video 200 is obtained as the result of synthesizing the upper portion A31 and the lower portion A33, excluding the middle portion A32, of the clipped range A3 of the bird's-eye view video 100. As a result, the video 213 of the bird's-eye view video 200 can widely display the front side and the rear side of the left-side video 103 of the bird's-eye view video 100. Similarly, the video 214 of the bird's-eye view video 200 is obtained as the result of synthesizing the upper portion A41 and the lower portion A43, excluding the middle portion A42, of the clipped range A4 of the bird's-eye view video 100. As a result, the video 214 of the bird's-eye view video 200 can widely display the front side and the rear side of the right-side video 104 of the bird's-eye view video 100.

[11th Embodiment]

Figure 28:
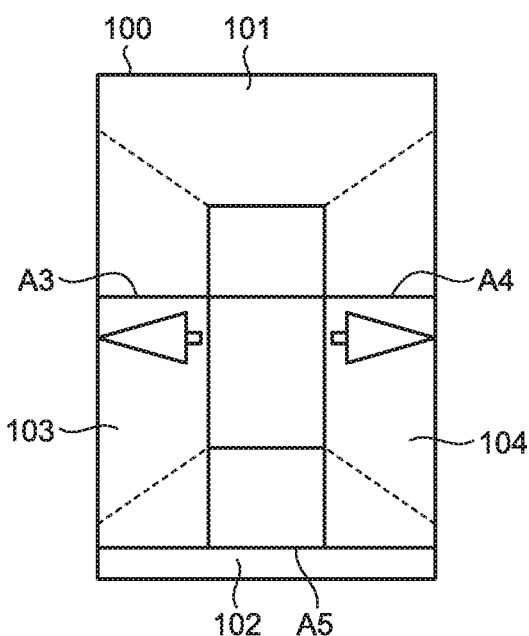
FIG. 28 is a diagram for explaining a method for generating the bird's-eye view video in the horizontally long shape in the bird's-eye view video generation system according to an 11th embodiment.
Figure 29:
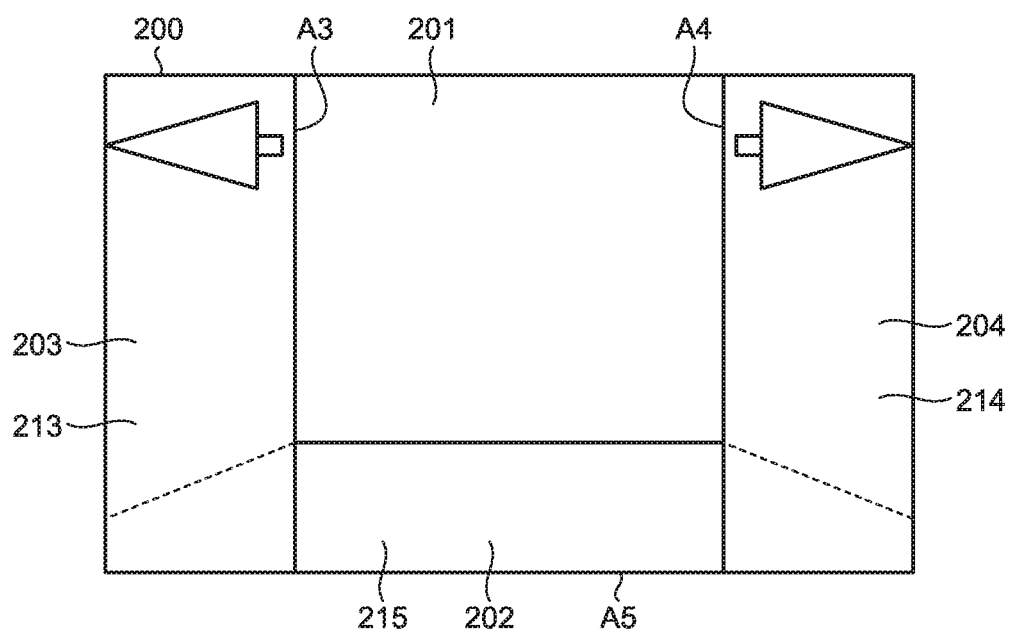
FIG. 29 is a diagram illustrating an example of the bird's-eye view video in the horizontally long shape generated from the bird's-eye view video illustrated in FIG. 28.

Explained below with reference to FIGS. 28 and 29 is the bird's-eye view video generation system 1A according to an 11th embodiment. FIG. 28 is a diagram for explaining a method for generating a horizontally long bird's-eye view video in the bird's-eye view video generation system according to the 11th embodiment. FIG. 29 is a diagram illustrating an example of a horizontally long bird's-eye view video generated from the bird's-eye view video illustrated in FIG. 28. In the bird's-eye view video generation system 1A according to the 11th embodiment, the method by which the bird's-eye view video generating unit 46A generates the horizontally long bird's-eye view video 200 is different from the method implemented in the bird's-eye view video generation system 1A according to the ninth embodiment.

Based on the obstacle information obtained by the obstacle information obtaining unit 43, when the direction of the detected obstacle corresponds to the front side or the rear side of the vehicle, the bird's-eye view video generating unit 46A overemphasizes the vertical long surrounding video, which is obtained either from the left-side camera 13 and the right-side camera 14, in the direction of the detected obstacle, and generates the horizontally long bird's-eye view video 200. In the 11th embodiment, the rear side is assumed to represent the direction of the detected obstacle.

In the left-side video 103 of the bird's-eye view video 100, the clipped range A3 illustrated in FIG. 28 is the range overemphasized toward the rear side that corresponds to the direction of the detected obstacle. Herein, the clipped range A3 includes the center and the lower side from the center in the vertical direction of the bird's-eye view video 100.

In the right-side video 104 of the bird's-eye view video 100, the clipped range A4 is the range overemphasized toward the rear side that corresponds to the direction of the detected obstacle. Herein, the clipped range A4 includes the center and the lower side from the center in the vertical direction. The clipped range A4 has an identical shape and identical dimensions to the clipped range A3.

A clipped range A5 is a rectangular range positioned between the clipped ranges A3 and A4 of the bird's-eye view video 100. The upper end of the clipped range A5 is collinear with the upper end of the clipped range A3 and the upper end of the clipped range A4. The lower end of the clipped range A5 is collinear with the lower end of the clipped range A3 and the lower end of the clipped range A4.

The bird's-eye view video generating unit 46A generates, from the clipped ranges A3, A4, and A5 of the generated bird's-eye view video 100, the horizontally long bird's-eye view video 200 according to the aspect ratio of the display screen of the display panel 31.

The following explanation is given about the horizontally long bird's-eye view video 200 generated from the bird's-eye view video 100.

The video 213 represents the video of the clipped range A3 of the bird's-eye view video 100. With reference to FIG.

29, the video of a tree displayed in the video 213 includes the entire video of the tree displayed in the clipped range A3 of the bird's-eye view video 100 illustrated in FIG. 28.

The video 214 represents the video of the clipped range A4 of the bird's-eye view video 100. With reference to FIG. 29, the video of a tree displayed in the video 214 includes the entire video of the tree displayed in the clipped range A4 of the bird's-eye view video 100 illustrated in FIG. 28.

A video 215 is obtained when the video of the clipped range A5 of the bird's-eye view video 100 is varied in size and shape according to the display panel 31 so that the boundary between the videos 213 and 214 becomes smoothly continuous. For example, the video 215 can be obtained when the video of the clipped range A5 of the bird's-eye view video 100 is expanded in the horizontal direction.

As described above, in the 11th embodiment, when the direction of the detected obstacle corresponds to the front side or the rear side of the vehicle, the left-side video 103 and the right-side video 104 of the bird's-eye view video 100 are overemphasized in the direction of the detected obstacle, and the horizontally long bird's-eye view video 200 is generated. As a result, in the bird's-eye view video 200, the direction in which the obstacle is detected in the bird's-eye view video 100 can be widely displayed.

[12th Embodiment]

Given below is an explanation of the bird's-eye view video generation system 1A according to a 12th embodiment. In the bird's-eye view video generation system 1A according to the 12th embodiment, the method by which the bird's-eye view video generating unit 46A generates the horizontally long bird's-eye view video 200 is different from the method implemented in the bird's-eye view video generation system 1A according to the 11th embodiment.

Based on the obstacle information obtained by the obstacle information obtaining unit 43, when the direction of the detected obstacle corresponds to the front side or the rear side of the vehicle, then the bird's-eye view video generating unit 46A overemphasizes the vertically long surrounding video, which is obtained either from the left-side camera 13 and the right-side camera 14, in the travelling direction of the vehicle, and generates the horizontally long bird's-eye view video 200.

As described above, in the 12th embodiment, when the direction of the detected obstacle corresponds to the front side or the rear side of the vehicle, the left-side video and the right-side video 104 of the bird's-eye view video 100 are overemphasized in the travelling direction of the vehicle, and the horizontally long bird's-eye view video 200 is generated. As a result, in the bird's-eye view video 200, the direction in which the obstacle is detected in the bird's-eye view video 100 can be widely displayed.

Meanwhile, although the explanation above is given about the bird's-eye view video generating system 1 according to the present application, it is possible to implement the present application in various other different forms other than the embodiments described above.

The constituent elements of the bird's-eye view video generation system 1 illustrated in the drawings are merely conceptual, and need not be physically configured as illustrated. That is, the specific configurations of the constituent elements are not limited to the illustrated configurations and the constituent elements, as a whole or in part, can be separated or integrated either functionally or physically based on various types of loads or use condition.

For example, the configuration of the bird's-eye view video generation system 1 can be implemented using a program as software loaded in a memory. In the embodiments described above, the explanation is given about the functional blocks implemented using cooperation of hardware and software. That is, each functional block can be implemented in various forms such as using either only hardware, or only software, or a combination of hardware and software.

The components described above include one that can easily be thought of by a person skilled in the art and one that is practically identical. Further, the configurations described above may be combined appropriately. Furthermore, within the scope not departing from the gist of the present disclosure, various omission, replacement, and modifications of the components may be made.

For example, if the distance to the closest obstacle is shorter than a predetermined threshold value, then the superimposed video generating unit 47 can display, in the center video 105 of the bird's-eye view video 100, the obstacle notification icon 120 along with a numerical value indicating the distance to the obstacle.

Alternatively, for example, if the distance to the closest obstacle is shorter than a predetermined threshold value, then the superimposed video generating unit 47 can display, in the center video 105 of the bird's-eye view video 100, the obstacle notification icon 120 along with a graphic that changes in shape or color according to the distance to the obstacle. Thus, in the bird's-eye view video generation system 1, in addition to the change in the obstacle notification icon 120 according to the distance to the obstacle, it also becomes possible to notify the distance to the obstacle. As a result, in the bird's-eye view video generation system 1, the obstacles present around the vehicle can be confirmed in a more proper manner.

When there is a plurality of obstacles, the controller 41 can display the obstacle notification icons 120 for the obstacle of the highest priority. For example, regarding the priority, the closest obstacle can be given the highest priority. Alternatively, for example, the moving obstacle can be given the highest priority. Still alternatively, for example, the moving obstacle that is coming closer to the vehicle can be given the highest priority.

When an obstacle is detected to be moving one, then an icon indicating that the obstacle is moving one can be displayed in the center video 105 of the bird's-eye view video 100. Examples of the icon indicating that the obstacle is moving one include an icon indicating a pedestrian or an icon indicating a vehicle. As a result, in the bird's-eye view video generation system 1, the obstacles present around the vehicle can be confirmed in a more proper manner.

Although it is explained that the obstacle notification icons 120 are made of the triple circular arc-like curved lines, that is not the only possible case. Alternatively, for example, each obstacle notification icon 120 can be an arrow-like graphic indicating the direction of the obstacle. In that case, each obstacle notification icon 120 can be an arrow-like graphic having a different line width and a size according to the distance to the obstacle.

In the embodiments described above, as the sensors representing the obstacle detecting units, six sensors, namely, the front left-side sensor 21A, the front center sensor 21B, the front right-side sensor 21C, the rear left-side sensor 22A, the rear center sensor 22B, and the rear right-side sensor 22C are used. However, the number of sensors is not limited to six. That is, if the direction of an obstacle is to be detected in a more segmentalized manner, the number of sensors can be increased.

In the embodiments described above, corresponding to the number of sensors, the obstacle notification icons 120 include the front left-side icon 121, the front center icon 122, the front right-side icon 123, the rear left-side icon 124, the rear center icon 125, and the rear right-side icon 126. However, that is not the only possible case. In other words, regarding the obstacle notification icons 120, the detection result of each sensor should correspond to the icon to be displayed.

Figure 30:
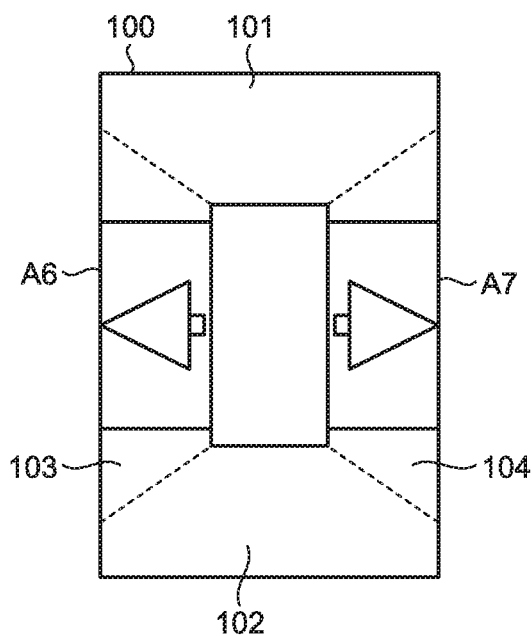
FIG. 30 is a diagram for explaining another example of the method for generating the bird's-eye view video in the horizontally long shape in the bird's-eye view video generation system.
Figure 31:
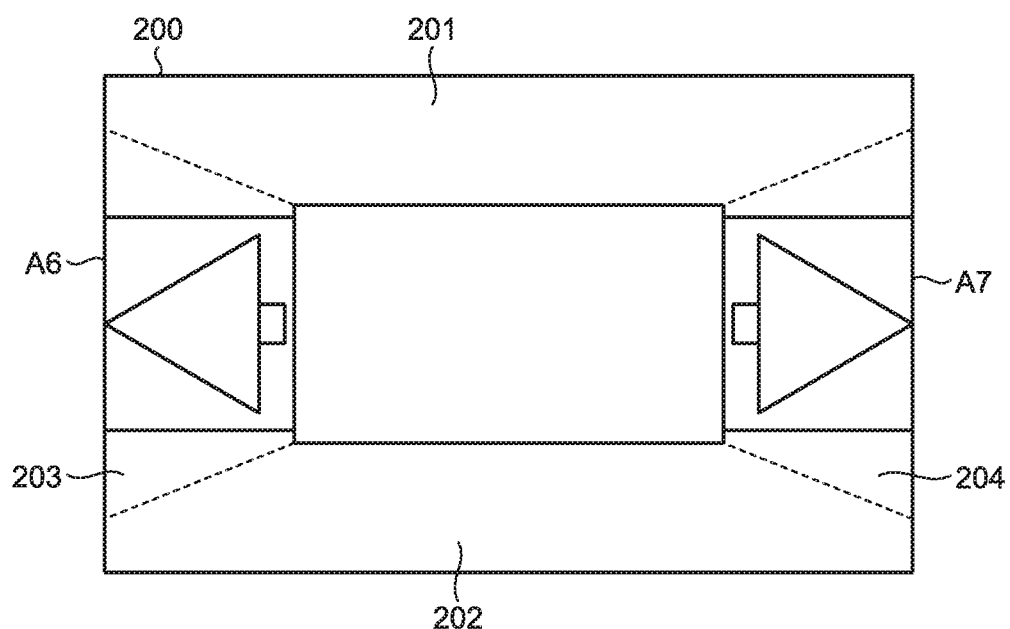
FIG. 31 is a diagram illustrating an example of the bird's-eye view video in the horizontally long shape generated from the bird's-eye view video illustrated in FIG. 30.

In the eighth embodiment, the bird's-eye view video generating unit 46 can generate the horizontally long bird's-eye view video 200 by compressing, in the vertical direction, the center of the surrounding video obtained from either the front camera 11 or the rear camera 12. The relevant explanation is given with reference to FIGS. 30 and 31. FIG. 30 is a diagram for explaining another example of the method for generating the horizontally long bird's-eye view video in the bird's-eye view video generation system. FIG. 31 is a diagram illustrating an example of a horizontally long bird's-eye view video generated from the bird's-eye view video illustrated in FIG. 30. The bird's-eye view video generating unit 46 compresses, in the vertical direction, a clipped range A6 of the center of the left-side video 103 of the bird's-eye view video 100 and a clipped range A7 of the center of the right-side video 104 of the bird's-eye view video 100, and generates the horizontally long bird's-eye view video 200 according to the aspect ratio of the display surface of the display panel 31.

In the embodiments described above, the controller 41A synthesizes, in the center of the bird's-eye view video 100 or the center of the bird's-eye view video 200, the surrounding video corresponding to the direction in which the closest obstacle to the vehicle is detected. Alternatively, the surrounding video to be synthesized can be left to user selection. For example, in the display screen of the display panel 31, the surrounding video of a position at which the user touches in the bird's-eye view video 100 or the bird's-eye view video 200 can be synthesized.

When the direction of the detected obstacle corresponds to the front side or the rear side of the vehicle, for example, the controller 41A can reduce color information of the left-side video 203 and the right-side video 204 of the bird's-eye view video 200. Alternatively, the direction of the detected obstacle corresponds to the front side or the rear side of the vehicle, for example, the controller 41A can display the left-side video 203 and the right-side video 204 of the bird's-eye view video 200 in a single color. Still alternatively, When the direction of the detected obstacle corresponds to the front side or the rear side of the vehicle, for example, the controller 41A can reduce the brightness of the left-side video 203 and the right-side video 204 of the bird's-eye view video 200. As a result, it becomes possible to make the driver recognize that there is a reduction in the volume of information on the left-side video 203 and the right-side video 204 of the bird's-eye view video 200.

Based on the obstacle information obtained by the obstacle information obtaining unit 43, When the direction of the detected obstacle corresponds to the front side or the rear side of the vehicle, then the bird's-eye view video generating unit 46A can hide the surrounding videos obtained either from the left-side camera 13 and the right-side camera 14, and can generate the horizontally long bird's-eye view video 200 using the surrounding videos obtained from the front camera 11 and the rear camera 12. In this case, the driver becomes able to visually confirm the right-side and the left-side of the vehicle.

The controller 41A can determine whether or not to start the display of the bird's-eye view video depending on, for example, whether or not an operation for starting the display of the bird's-eye view video is performed with respect to an operating unit.

In the seventh embodiment, as the sensors for the obstacle detecting units, four sensors, namely, the front sensor 21, the rear sensor 22, the left-side sensor 23, and the right-side sensor 24 are provided. However, the number of sensors is not limited to four. That is, if the direction of an obstacle is to be detected in a more segmentalized manner, the number of sensors can be increased.

According to the present application, it becomes possible to properly confirm obstacles present around a vehicle.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bird's-eye view video generation device comprising:
a video capturing unit configured to capture a surrounding video in which surrounding of a vehicle is imaged;
a video generating unit configured to generate a bird's-eye view video by performing viewpoint conversion with respect to the surrounding video captured by the video capturing unit so that the vehicle is viewed from above;
an obstacle information obtaining unit configured to obtain obstacle information of an obstacle detected in a range farther than a display range of the bird's-eye view video including a distance to the detected obstacle; and
a display controller configured to display the bird's-eye view video generated by the video generating unit in a display, wherein
the video generating unit is further configured to;
when the distance to the detected obstacle is determined to be longer than the display range of the bird's-eye view video based on the obstacle information obtained by the obstacle information obtaining unit, generate the bird's-eye view video in which a vehicle icon which indicates the vehicle is displayed at a center thereof enclosed by the bird's-eye view video and the obstacle information is superimposed thereon; and
when the distance to the detected obstacle is determined to be within the display range of the bird's-eye view video based on the obstacle information obtained by the obstacle information obtaining unit, generate the bird's-eye view video in which the obstacle information is superimposed on the center thereof enclosed by the bird's-eye view video.

2. The bird's-eye view video generation device according to claim 1, wherein the obstacle information corresponds to information indicating a direction in which the obstacle is detected.

3. The bird's-eye view video generation device according to claim 1, wherein the obstacle information varies according to the distance to the detected obstacle.

4. The bird's-eye view video generation device according to claim 1, wherein
the obstacle information contains a plurality of constituent elements oriented in a direction of the detected obstacle, and indicates the distance to the obstacle by an interval between the plurality of constituent elements, and the video generating unit is further configured to vary the interval between the plurality of constituent elements based on the distance to the detected obstacle.

5. The bird's-eye view video generation device according to claim 1, wherein
the obstacle information obtaining unit is further configured to obtain the obstacle information containing a horizontal width of the detected obstacle, and
the video generating unit is further configured to, based on the obstacle information obtained by the obstacle information obtaining unit, generate the bird's-eye view video in which the obstacle information with a width corresponding to the horizontal width of the detected obstacle is superimposed on the center thereof enclosed by the bird's-eye view video.

6. The bird's-eye view video generation device according to claim 1, wherein the video generating unit is further configured to, based on the obstacle information obtained by the obstacle information obtaining unit, generate the bird's-eye view video in which the obstacle information of the obstacle present in a travelling direction of the vehicle is superimposed on the center thereof enclosed by the bird's-eye view video.

7. A bird's-eye view video generation system comprising:
the bird's-eye view video generation device according to claim 1; and
at least either one of
the cameras configured to capture the surrounding of the vehicle to provide the surrounding videos to the video capturing unit;
the obstacle detecting unit configured to detect the obstacle around the vehicle to provide the obstacle information to the obstacle information obtaining unit; and
the display.

8. A bird's-eye view video generation method comprising:
capturing a surrounding video in which surrounding of a vehicle is captured;
generating a bird's-eye view video by performing viewpoint conversion with respect to the captured surrounding video so that the vehicle is viewed from above;
obtaining obstacle information of an obstacle detected in a range farther than a display range of the bird's-eye view video including a distance to the detected obstacle; and
displaying the generated bird's-eye view video in a display, wherein in the generating the bird's-eye view video,
when the distance to the detected obstacle is determined to be longer than the display range of the bird's-eye view video based on the obtained obstacle information, generating the bird's-eye view video in which a vehicle icon which indicates the vehicle is displayed at a center thereof enclosed by the bird's-eye view video and the obtained obstacle information is superimposed thereon; and
when the distance to the detected obstacle is determined to be within the display range of the bird's-eye view video based on the obtained obstacle information, generating the bird's-eye view video in which the obstacle information is superimposed on the center thereof enclosed by the bird's-eye view video.

9. A non-transitory storage medium that stores a program that causes a computer, which functions as a bird's-eye view video generation device, to execute:
capturing a surrounding video in which surrounding of a vehicle is captured;
generating a bird's-eye view video by performing viewpoint conversion with respect to the captured surrounding video so that the vehicle is viewed from above;
obtaining obstacle information of an obstacle detected in a range farther than a display range of the bird's-eye view video including a distance to the detected obstacle; and
displaying the generated bird's-eye view video in a display, wherein in the generating the bird's-eye view video,
when the distance to the detected obstacle is determined to be longer than the display range of the bird's-eye view video based on the obtained obstacle information, generating the bird's-eye view video in which a vehicle icon which indicates the vehicle is displayed at a center thereof enclosed by the bird's-eye view video and the obtained obstacle information is superimposed thereon; and
when the distance to the detected obstacle is determined to be within the display range of the bird's-eye view video based on the obtained obstacle information, generating the bird's-eye view video in which the obstacle information is superimposed on the center thereof enclosed by the bird's-eye view video.

* * * * *